(12) United States Patent
Horikoshi et al.

(10) Patent No.: US 10,389,452 B2
(45) Date of Patent: Aug. 20, 2019

(54) COHERENT OPTICAL RECEPTION DEVICE

(71) Applicants: NIPPON TELEGRAPH AND TELEPHONE CORPORATION, Tokyo (JP); NTT Electronics Corporation, Yokohama-shi, Kanagawa (JP)

(72) Inventors: Kengo Horikoshi, Yokosuka (JP); Mitsuteru Yoshida, Yokosuka (JP); Seiji Okamoto, Yokosuka (JP); Eiichi Hosoya, Yokosuka (JP); Etsushi Yamazaki, Yokohama (JP); Yasuharu Onuma, Yokohama (JP); Tomohiro Takamuku, Yokohama (JP); Naoki Miura, Yokohama (JP); Sadayuki Yasuda, Yokohama (JP)

(73) Assignees: NIPPON TELEGRAPH AND TELEPHONE CORPORATION, Tokyo (JP); NTT Electronics Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 15/748,892

(22) PCT Filed: Oct. 17, 2016

(86) PCT No.: PCT/JP2016/080700
§ 371 (c)(1),
(2) Date: Jan. 30, 2018

(87) PCT Pub. No.: WO2017/069086
PCT Pub. Date: Apr. 24, 2017

(65) Prior Publication Data
US 2019/0013876 A1    Jan. 10, 2019

(30) Foreign Application Priority Data

Oct. 19, 2015  (JP) ................................. 2015-205604
Mar. 31, 2016  (JP) ................................. 2016-073735

(51) Int. Cl.
*H04B 10/06* (2006.01)
*H04B 10/61* (2013.01)
(Continued)

(52) U.S. Cl.
CPC ..... *H04B 10/6166* (2013.01); *H04B 10/2513* (2013.01); *H04B 10/2569* (2013.01);
(Continued)

(58) Field of Classification Search
CPC .............. H04B 10/6166; H04B 10/532; H04B 10/6165; H04B 10/613; H04B 10/614;
(Continued)

(56) References Cited

U.S. PATENT DOCUMENTS 8,824,902 B2 * 9/2014 Sakamoto ............ H04B 10/032
398/115
9,531,472 B2 * 12/2016 Zhang ................ H04B 10/2507
(Continued)

FOREIGN PATENT DOCUMENTS

JP   2012-253655 A   12/2012
JP   2014-509121 A    4/2014
(Continued)

OTHER PUBLICATIONS

S.Suzuki et al., R&D on the Digital Coherent Signal Processing Technology for Large-capacity Optical Communication Networks, National Institute of Information and Communications Technology, vol. 95, No. 12, pp. 1100-1116, Dec. 2012 with partial translation thereof.

(Continued)

*Primary Examiner* — Hibret A Woldekidan
(74) *Attorney, Agent, or Firm* — Harness, Dickey & Pierce, P.L.C.

(57) ABSTRACT

A coherent optical reception device includes a local oscillation laser that supplies laser light, a coherent optical (Continued)

reception front-end unit that receives a multi-level modulated optical signal, demodulates the optical signal on the basis of the laser light, and converts a demodulated optical signal into an electrical analog signal, an analog-to-digital converter that converts the analog signal into a digital signal, a compensation unit that compensates for an influence of dispersion due to a wavelength or a polarized wave of the optical signal and recovers a carrier phase of the digital signal, a constellation distortion compensation unit that compensates for constellation distortion of the multi-level modulation included in the digital signal in which an influence of dispersion is compensated for by the compensation unit, and an error correction decoding unit that performs error correction of the digital signal in which the constellation distortion is compensated for.

11 Claims, 12 Drawing Sheets

(51) Int. Cl.
| | | |
|---|---|---|
| H04L 27/36 | (2006.01) | |
| H04L 27/38 | (2006.01) | |
| H04B 10/532 | (2013.01) | |
| H04J 14/06 | (2006.01) | |
| H04B 10/2513 | (2013.01) | |
| H04B 10/2569 | (2013.01) | |
| H04L 27/00 | (2006.01) | |
| G02F 1/21 | (2006.01) | |

(52) U.S. Cl.
CPC ......... *H04B 10/532* (2013.01); *H04B 10/616* (2013.01); *H04B 10/6161* (2013.01); *H04B 10/6162* (2013.01); *H04B 10/6164* (2013.01); *H04B 10/6165* (2013.01); *H04J 14/06* (2013.01); *H04L 27/362* (2013.01); *H04L 27/3818* (2013.01); *H04L 27/3863* (2013.01); *G02F 1/21* (2013.01); *G02F 2001/212* (2013.01); *H04B 2210/252* (2013.01); *H04L 27/0014* (2013.01); *H04L 27/3827* (2013.01); *H04L 2027/0026* (2013.01)

(58) Field of Classification Search
CPC ............ H04B 10/616; H04B 10/07953; H04B 10/0799; H04B 10/60; H04B 10/6161; H04B 10/6162; H04B 10/6163; H04B 10/6164; H04L 27/3818; H04L 27/362; H04L 2027/0026; H04J 14/06; G02F 1/21; G02F 2001/212

USPC ... 398/65, 81, 147, 149, 150, 159, 202, 203, 398/204, 208, 210, 205
See application file for complete search history.

(56) References Cited

U.S. PATENT DOCUMENTS

| | | | |
|---|---|---|---|
| 9,647,767 B2* | 5/2017 | Guo | ................... H04B 10/6164 |
| 9,853,734 B1* | 12/2017 | Fan | ........................ H04B 10/40 |
| 10,110,317 B1* | 10/2018 | Morero | .................. H04B 10/50 |
| 2010/0303474 A1 | 12/2010 | Nakashima et al. | |
| 2012/0057863 A1 | 3/2012 | Winzer et al. | |
| 2012/0308233 A1 | 12/2012 | Hironishi et al. | |
| 2014/0169501 A1 | 6/2014 | Nazarathy et al. | |
| 2014/0219653 A1* | 8/2014 | Djordjevic | .............. H04J 14/06 398/44 |
| 2014/0270759 A1* | 9/2014 | Djordjevic | ............ H04L 1/0043 398/44 |
| 2014/0301743 A1* | 10/2014 | Nakashima | .......... H04B 10/697 398/209 |
| 2015/0078739 A1 | 3/2015 | Handelman | |
| 2015/0295747 A1* | 10/2015 | Tanaka | ................ H04L 27/3444 375/261 |
| 2016/0285558 A1 | 9/2016 | Abe | |
| 2018/0219645 A1* | 8/2018 | Giraldo | .............. H04J 14/0227 |
| 2018/0316541 A1* | 11/2018 | Liu | ..................... H04L 27/0014 |
| 2019/0074909 A1* | 3/2019 | Yamazaki | .......... H04B 10/6164 |

FOREIGN PATENT DOCUMENTS

| | | |
|---|---|---|
| WO | WO-2012/100253 A2 | 7/2012 |
| WO | WO-2014/162649 A1 | 10/2014 |
| WO | WO-2015/136877 A1 | 9/2015 |
| WO | WO-2015/154962 A1 | 10/2015 |

OTHER PUBLICATIONS

T.Sugihara, Recent Progress of Pre-equalization Technology for High-speed Optical Communication, The Institute of Electronics, Information and Communication Engineers, IEICE Technical report, OCS2011-41 (Jul. 2011), pp. 83-88 with partial translation thereof.
International Search Report for PCT/JP2016/080700, ISA/JP, Tokyo, dated Nov. 15, 2016, with English translation attached.
Chen Zhu, Advanced Equalization and Performance Monitoring Techniques in Single-Carrier Coherent Optical Systems, Thesis, May 1, 2014 (May 1, 2014), p. 202 pp, XP055495056, DOI: 10.1364/OE.24.026756, Retrieved from the Internet: URL:https://minervaaccess.unimelb.edu.au/bitstream/handle/11343/42051/Thesis_Chen_submitted.pdf?sequence=1&isAllowed=y.
European Search Report in related application EP 16857401.0 dated Jun. 14, 2019.

* cited by examiner

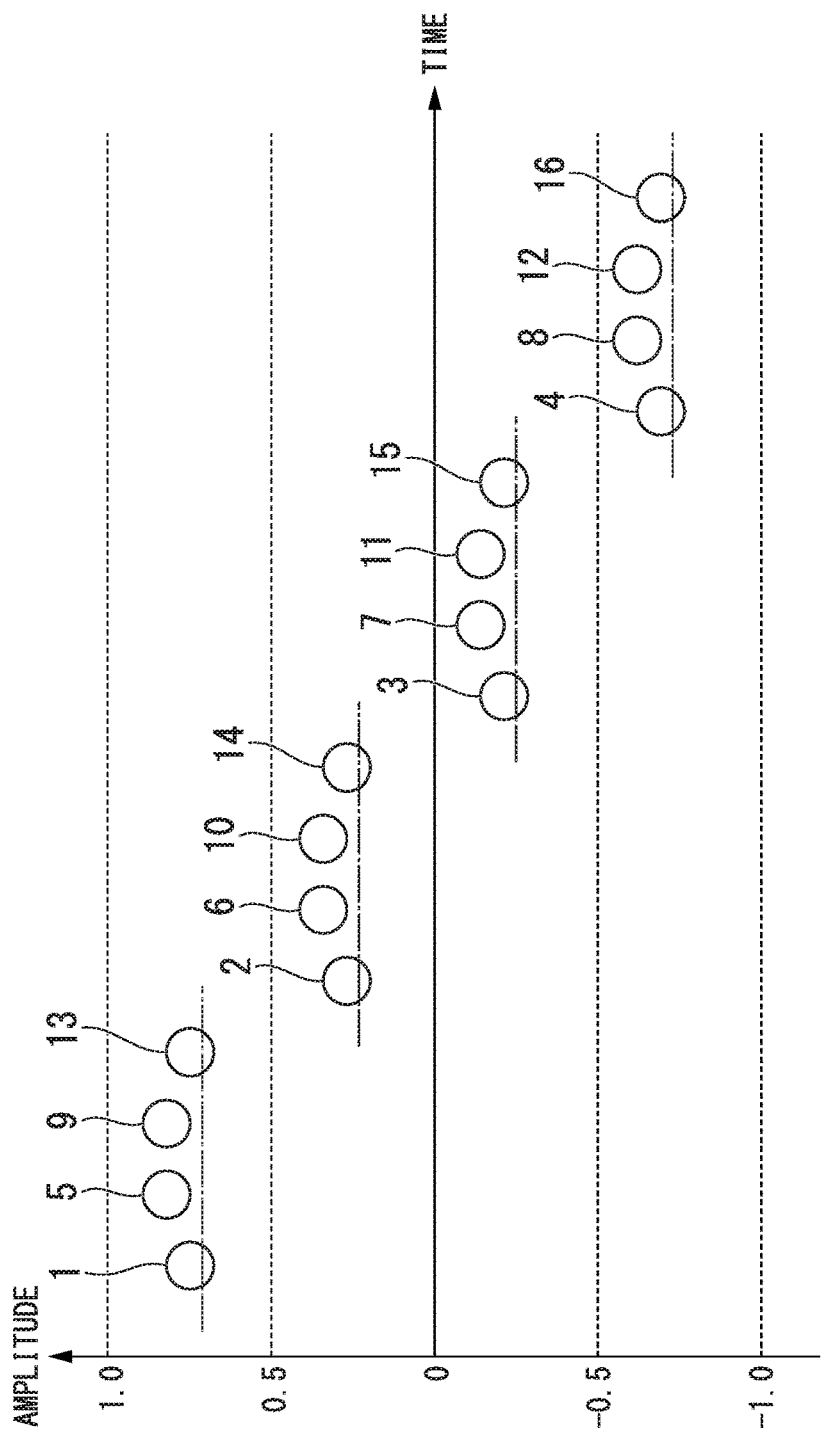

COHERENT OPTICAL RECEPTION DEVICE

CROSS-REFERENCE TO RELATED APPLICATIONS

This application is a 371 U.S. National Stage of International Application No. PCT/JP2016/080700, filed Oct. 17, 2016. Priority is claimed on Japanese Patent Application No. 2015-205604, filed Oct. 19, 2015 and Japanese Patent Application No. 2016-073735, filed Mar. 31, 2016. The contents of the above applications are incorporated herein by reference.

TECHNICAL FIELD

The present invention relates to a coherent optical reception device.

BACKGROUND ART

A coherent optical data transfer scheme of which commercial introduction began from around 2010 has now become a key technology supporting long-distance optical communication. In recent years, the coherent optical data transfer scheme has become more and more important. For example, application to a metro access network has been examined. Initially, a coherent optical data transfer scheme was realized by performing polarized-wave multiplexing Quadrature Phase Shift Keying (QPSK) modulation on an optical channel with a 100 Gbit/s capacity. Here, the polarized-wave multiplexing wave refers to a multiplexing scheme for allocating individual data to each of two orthogonal X-polarized and Y-polarized wave components included in an optical signal. For example, FIG. 14 is a diagram in which an example of a transmission system using an optical transmitter and an optical receiver that perform coherent optical data transmission shown in FIG. 1 of Non-Patent Document 1 is cited. The transmission system modulates each of the X-polarized wave and the Y-polarized wave with different 50 Gbit/s QPSK (4-level phase modulation) codes, performs polarized-wave multiplexing, and performs long-distance transmission with a polarized-wave multiplexing QPSK signal of 100 Gbit/s per wavelength.

For additional reduction of costs with respect to capacity, realization of a large-capacity optical channel of 200 Gbit/s or more with a coherent optical data transmission system using multi-level modulation such as 16QAM (Quadrature Amplitude Modulation) has been attempted. A problem apparent includes constellation distortion when multi-level modulation such as such polarized-wave multiplexing QPSK, 16QAM, and 64QAM is used. A multi-level modulation signal is handled as an electric signal of four lanes in an electrical stage. That is, on the transmission side, a signal is generated as an electric signal of four lanes and converted into a multi-level modulated optical signal by an optical modulator.

As the optical modulator, for example, a Mach-Zehnder interferometer type modulator is applied. In such an optical modulator, there is imperfection caused by an error of a bias voltage or a finite extinction ratio of the interferometer, and constellation distortion is caused by such imperfection. When constellation distortion occurs, transmitted information cannot be correctly decoded, and an increase in a bit error rate or the like occurs. Here, the constellation is also called a signal space diagram and represents data signal points resulting from digital modulation in a two-dimensional complex plane (see, for example, "constellation" shown in FIG. 14, or FIG. 2 of Non-Patent Document 2).

QPSK is a four-level phase modulation and can be regarded as one that independently performs two-level amplitude modulation on an in-phase component and a quadrature phase component. The constellation of QPSK is a form in which points are arranged on the same circumference and are 90° apart from each other. On the other hand, 16QAM and 64QAM are modulation schemes having a constellation consisting of 16 points and 64 points, respectively. In the constellation of 16QAM and 64QAM, 16 points and 64 points are generally arranged in a square form in a signal space. 16QAM can be regarded as performing amplitude modulation with 4 independent levels on each of the in-phase component and the quadrature phase component. 64QAM can be regarded as performing amplitude modulation with 8 independent levels on each of the in-phase component and the quadrature phase component.

A direct current (DC) offset is one cause of constellation distortion. Generally, a bias voltage is applied to an optical modulator so that an optical output becomes a null point. However, in a case where the bias voltage is shifted from the null point, DC offset occurs. Further, in a Mach-Zehnder interferometer constituting an optical modulator, it is ideal that an extinction ratio (on/off ratio) is infinite, that is, the optical output is completely zero at the time of being off. However, in a case where the optical output is not completely zero at the time of being off, the extinction ratio is not infinite and DC offset occurs. In the optical signal, since the DC offset appears in the form of a residual carrier, the DC offset can be confirmed by observing a spectrum of the optical signal.

The DC offset and the residual carrier due to the DC offset occur in a direct detection scheme (for example, a scheme of directly detecting the intensity of an on and off signal of 1010 with an optical reception element, also referred to as intensity modulation direct detection, or the like) rather than a coherent detection scheme that uses a local oscillation laser. In the direct detection scheme, since a residual carrier appears as a DC offset in an electrical stage on the reception side again, the residual carrier can be easily removed in an analog DC block circuit using a capacitor or the like. On the other hand, in the coherent detection scheme, when a frequency of a transmission laser and a frequency of a local oscillation laser on the reception side do not exactly coincide, the residual carrier cannot be removed in a DC block circuit without converting the residual carrier into a DC in an electrical stage on the reception side.

Further, in-phase/quadrature (IQ) crosstalk is known as constellation distortion. IQ crosstalk occurs when a phase difference between an in-phase component and a quadrature phase component is not exactly 90° due to a bias voltage error of an optical modulator.

To cope with the constellation distortion problem, a technology for measuring characteristics of an optical modulator applied to an optical transmission device in advance and compensating for the characteristics of the optical modulator using a digital signal processing device on the optical transmission device side has been disclosed (for example, see Non-Patent Document 2).

CITATION LIST

Patent Literature

[Non-Patent Document 1]
Senichi Suzuki et al., "R & D on the Digital Coherent Signal Processing Technology for Large-capacity Optical Communication Networks", Journal of IEICE 95 (12), 2012 Dec. 1, pp. 1100-1116
[Non-Patent Document 2]
Takashi Sugihara. "Recent Progress of Pre-equalization Technology for High-speed Optical Communication", institute of Electronics, information and Communication Engineers, IEICE, IEICE Technical Report, OCS2011-41 (2011-7), pp 83-88

SUMMARY OF INVENTION

Technical Problem

However, when characteristics of an optical modulator cannot be measured in advance or when characteristics change over time, there is a problem in that the technology described in Non-Patent Document 2 cannot be used.

In particular, there is a problem in that it is difficult that the digital signal processing device on the optical transmission device side compensates variation drift of an automatic bias control circuit that controls a bias voltage applied to an optical modulator or imperfection of the optical modulator caused by error in a signal applied by the automatic bias control circuit.

An object of the present invention is to provide a technology capable of compensating for constellation distortion on the reception side in view of the above circumstances.

Solution to Problem

According to a first aspect of the present invention, a coherent optical reception device includes a local oscillation laser that supplies laser light; a coherent optical reception front-end unit that receives a multi-level modulated optical signal, demodulates the optical signal on the basis of the laser light, and converts a demodulated optical signal into an electrical analog signal; an analog-to-digital converter that converts the analog signal into a digital signal; a compensation unit that compensates for an influence of dispersion due to a wavelength or a polarized wave of the optical signal and recovers a carrier phase of the digital signal; a constellation distortion compensation unit that compensates for constellation distortion of the multi-level modulation included in the digital signal in which an influence of dispersion is compensated for by the compensation unit; and an error correction decoding unit that performs error correction of the digital signal in which the constellation distortion is compensated for.

According to a second aspect of the present invention, in the coherent optical reception device according to the first aspect, the constellation distortion compensation unit includes a DC offset compensation unit that compensates for a DC offset as the constellation distortion with respect to the digital signal.

According to a third aspect of the present invention, in the coherent optical reception device according to the second aspect, the DC offset compensation unit includes an averaging unit that reduces a modulation data component from the digital signal, removes random noise through averaging, and extracts the DC offset included in the digital signal; and a first subtraction circuit that subtracts the DC offset extracted by the averaging unit from the digital signal.

According to a fourth aspect of the present invention, in the coherent optical reception device according to the third aspect, the averaging unit includes a provisional decision circuit that extracts the modulation data component from the digital signal; a second subtraction circuit that subtracts the modulation data component extracted by the provisional decision circuit from the digital signal; and a filter circuit that averages the subtraction result obtained by subtracting the modulation data component from the digital signal.

According to a fifth aspect of the present invention, in the coherent optical reception device according to the third aspect or the fourth aspect, the DC offset compensation unit further includes an offset value adjustment unit that multiplies the DC offset extracted by the averaging unit by a weighting coefficient according to an amplitude of a signal of a quadrature phase component of the digital signal when the DC offset included in a signal of an in-phase component of the digital signal is compensated for, multiplies the DC offset extracted by the averaging unit by a weighting coefficient according to an amplitude of the signal of the in-phase component of the digital signal when the DC offset included in the signal of the quadrature phase component of the digital signal is compensated for, and outputs the DC offset multiplied by the weighting coefficient to the first subtraction circuit, and the first subtraction circuit subtracts the DC offset multiplied by the weighting coefficient output from the offset value adjustment unit, from the digital signal.

According to a sixth aspect of the present invention, in the coherent optical reception device according to the fifth aspect, the offset value adjustment unit sets the weighting coefficient to a value greater than 1 when the amplitude of the signal of the quadrature phase component of the digital signal is smaller than a predetermined threshold value in a case in which the DC offset included in the signal of the in-phase component of the digital signal is compensated for or when the amplitude of the signal of the in-phase component of the digital signal is smaller than the predetermined threshold value in a case in which the DC offset included in the signal of the quadrature phase component of the digital signal is compensated for.

According to a seventh aspect of the present invention, in the coherent optical reception device according to the fifth aspect or the sixth aspect, the offset value adjustment unit sets the weighting coefficient to a value smaller than 1 when the amplitude of the signal of the quadrature phase component of the digital signal is equal to or greater than the predetermined threshold value in a case in which the DC offset included in the signal of the in-phase component of the digital signal is compensated for or when the amplitude of the signal of the in-phase component of the digital signal is equal to or greater than the predetermined threshold value in a case in which the DC offset included in the signal of the quadrature phase component of the digital signal is compensated for.

According to an eighth aspect of the present invention, in the coherent optical reception device according to the first aspect, the constellation distortion compensation unit includes an IQ crosstalk compensation unit that compensates for IQ crosstalk as the constellation distortion with respect to a signal of an in-phase component and a quadrature phase component of the digital signal.

According to a ninth aspect of the present invention, in the coherent optical reception device according to the eighth aspect, the IQ crosstalk compensation unit includes a first provisional decision circuit that temporarily decides the signal of the in-phase component of the digital signal and extracts an in-phase modulation data component; a first coefficient multiplication circuit that calculates the amount of leakage of the in-phase component to the signal of the quadrature phase component in the digital signal on the basis of the in-phase modulation data component; a second provisional decision circuit that temporarily decides the signal of the quadrature phase component of the digital signal and extracts a quadrature phase modulation data component; a second coefficient multiplication circuit that calculates the amount of leakage of the quadrature phase component to the signal of the in-phase component in the digital signal on the basis of the quadrature phase modulation data component; a first subtraction circuit that subtracts an output value of the second coefficient multiplication circuit from the signal of the in-phase component signal of the digital signal; and a second subtraction circuit that subtracts an output value of the first coefficient multiplication circuit from the signal of the quadrature phase component signal of the digital signal.

According to a tenth aspect of the present invention, in the coherent optical reception device according to the ninth aspect, the IQ crosstalk compensation unit includes a first correlation coefficient calculation unit that calculates a first correlation coefficient indicating correlation between the in-phase component included in the signal of the quadrature phase component of the digital signal and the signal of the in-phase component; and a second correlation coefficient calculation unit that calculates a second correlation coefficient indicating correlation between the quadrature phase component included in the signal of the in-phase component of the digital signal and the signal of the quadrature phase component, and the first coefficient multiplication circuit multiplies the in-phase modulation data component by the first correlation coefficient and outputs a result of the multiplication, and the second coefficient multiplication circuit multiplies the quadrature phase modulation data component by the second correlation coefficient and outputs a result of the multiplication.

According to an eleventh aspect of the present invention, in the coherent optical reception device according to the tenth aspect, the first correlation coefficient calculation unit includes: a first signal normalization circuit that divides the quadrature phase modulation data component by a square of a norm of the quadrature phase modulation data component and outputs a result of the division; a first inner product calculation circuit that calculates an inner product of an output value of the first signal normalization circuit and the signal of the in-phase component; and a first averaging circuit that averages an inner product value calculated by the first inner product calculation circuit and outputs the first correlation coefficient, and the second correlation coefficient calculation unit includes a second signal normalization circuit that divides the quadrature phase modulation data component by a square of a norm of the quadrature phase modulation data component and outputs a result of the division; a second inner product calculation circuit that calculates an inner product of an output value of the second signal normalization circuit and the signal of the quadrature phase component; and a second averaging circuit that averages an inner product value calculated by the second inner product calculation circuit and outputs the second correlation coefficient.

According to a twelfth aspect of the present invention, in the coherent optical reception device according to the first aspect, the constellation distortion compensation unit includes a DC offset compensation unit that compensates for a DC offset as the constellation distortion with respect to the digital signal; and an IQ crosstalk compensation unit that compensates for IQ crosstalk as the constellation distortion with respect to a signal of an in-phase component and a quadrature phase component of the digital signal.

According to a thirteenth aspect of the present invention, in the coherent optical reception device according to the twelfth aspect, the constellation distortion compensation unit includes the DC offset compensation unit in a stage subsequent to the compensation unit and includes the IQ crosstalk compensation unit in a stage subsequent to the DC offset compensation unit or the constellation distortion compensation unit includes the IQ crosstalk compensation unit in a stage subsequent to the compensation unit and includes the DC offset compensation unit in a stage subsequent to the IQ crosstalk compensation unit.

Advantageous Effects of Invention

According to the present invention, it is possible to compensate for constellation distortion on the reception side.

BRIEF DESCRIPTION OF DRAWINGS

FIG. 7 is a diagram schematically showing a signal of an in-phase component (I component) of an X-polarized wave or a Y-polarized wave input to the DC offset compensation unit.

DESCRIPTION OF EMBODIMENTS

Hereinafter, embodiments of the present invention will be described with reference to the accompanying drawings.

Figure 1:
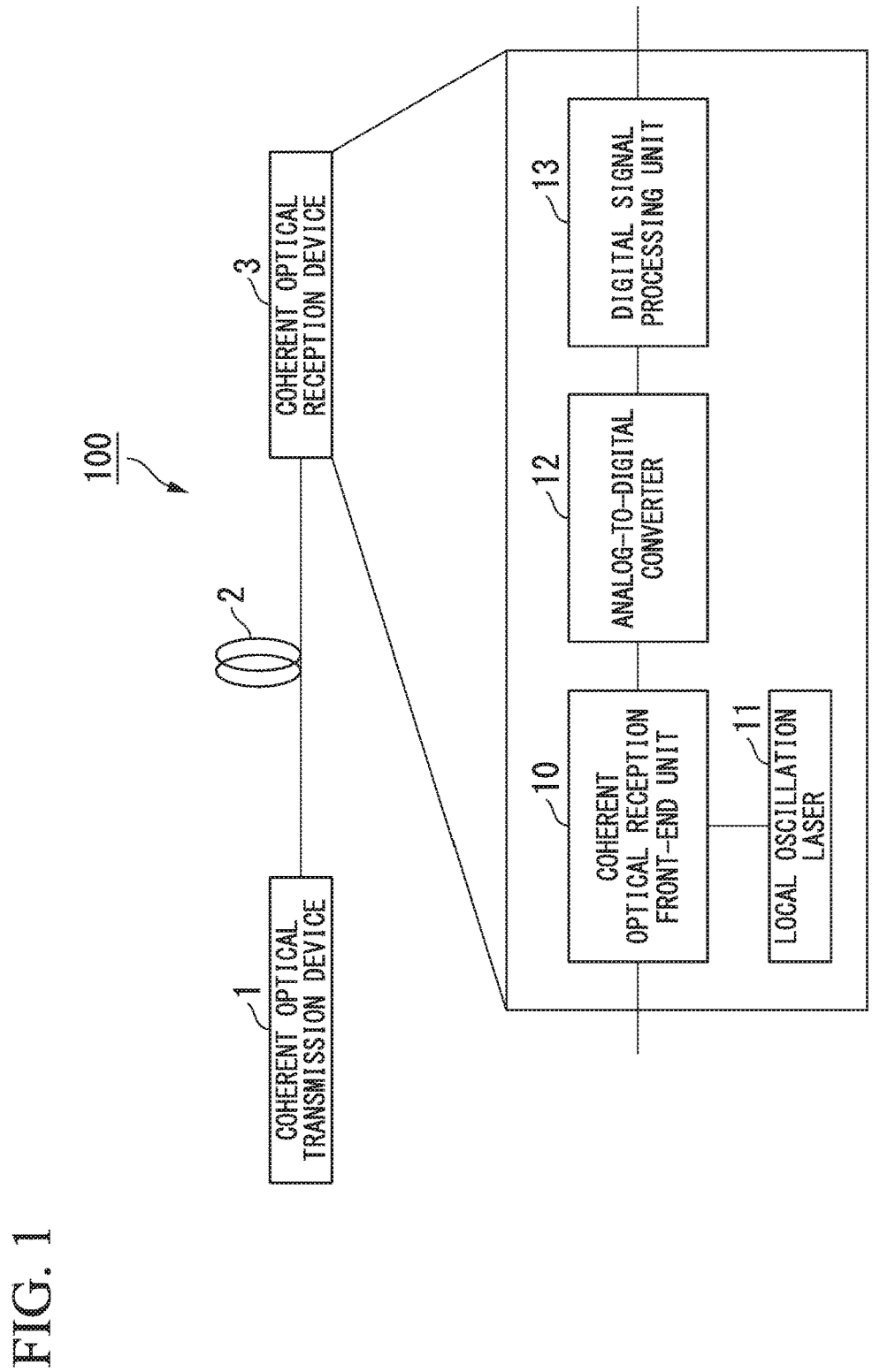
FIG. 1 is a block diagram showing a configuration of a coherent optical data transmission system according to an embodiment.

FIG. 1 is a block diagram showing a configuration of a coherent optical data transmission system 100 according to this embodiment. The coherent optical data transmission system 100 includes a coherent optical transmission device 1 and a coherent optical reception device 3. The coherent optical transmission device 1 and the coherent optical reception device 3 are connected via an optical fiber 2.

The coherent optical transmission device 1, for example, maps transmission data to a polarized-wave multiplexing 16QAM signal that is a multi-level modulation signal. The coherent optical transmission device 1 performs modulation based on a mapping result on laser light output by a transmission laser using a polarized-wave multiplexing IQ modulator, and outputs an optical signal generated through the modulation to the optical fiber 2.

The coherent optical reception device 3 includes a coherent optical reception front-end unit 10, a local oscillation laser 1, an analog-to-digital converter 12, and a digital signal processing unit 13.

The local oscillation laser 11 supplies oscillation laser light for demodulation to the coherent optical reception front-end unit 10. Here, it is assumed that the local oscillation laser 11 operates independently of a transmission laser applied to the coherent optical transmission device 1, and is not frequency-synchronized with the transmission laser.

Figure 14:
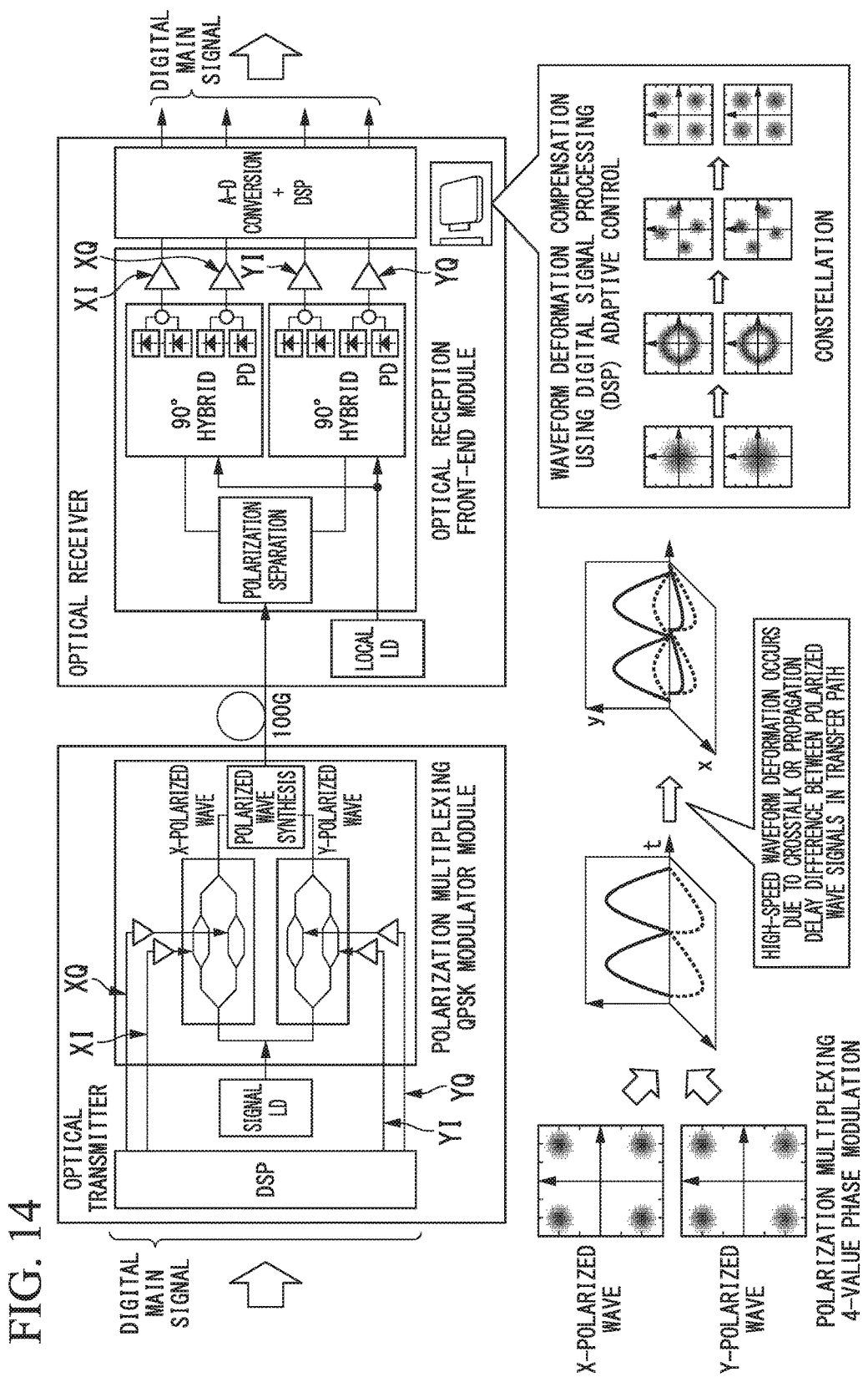
FIG. 14 is a diagram showing a configuration of a coherent optical data transmission system of the related art.

As the coherent optical reception front-end unit 10, for example, an optical reception front-end module of an optical receiver shown in FIG. 14 is applied. The coherent optical reception front-end unit 10 performs polarization separation of a received optical signal into an X-polarized wave and a Y-polarized wave, and then, performs demodulation of the X-polarized wave and the Y-polarized wave on the basis of the laser light supplied from the local oscillation laser 11. The coherent optical reception front-end unit 10 outputs electrical analog signals of 4 lanes including the in-phase component (I component) of the X-polarized wave, the quadrature phase component (Q component) of the X-polarized wave, the in-phase component of the Y-polarized wave, and the quadrature phase component of the Y-polarized wave obtained by the demodulation.

The analog-to-digital converter 12 converts the analog signals of 4 lanes into digital signals.

The digital signal processing unit 13 performs signal processing on the digital signals after conversion obtained by the conversion in the analog-to-digital converter 12.

Figure 2:
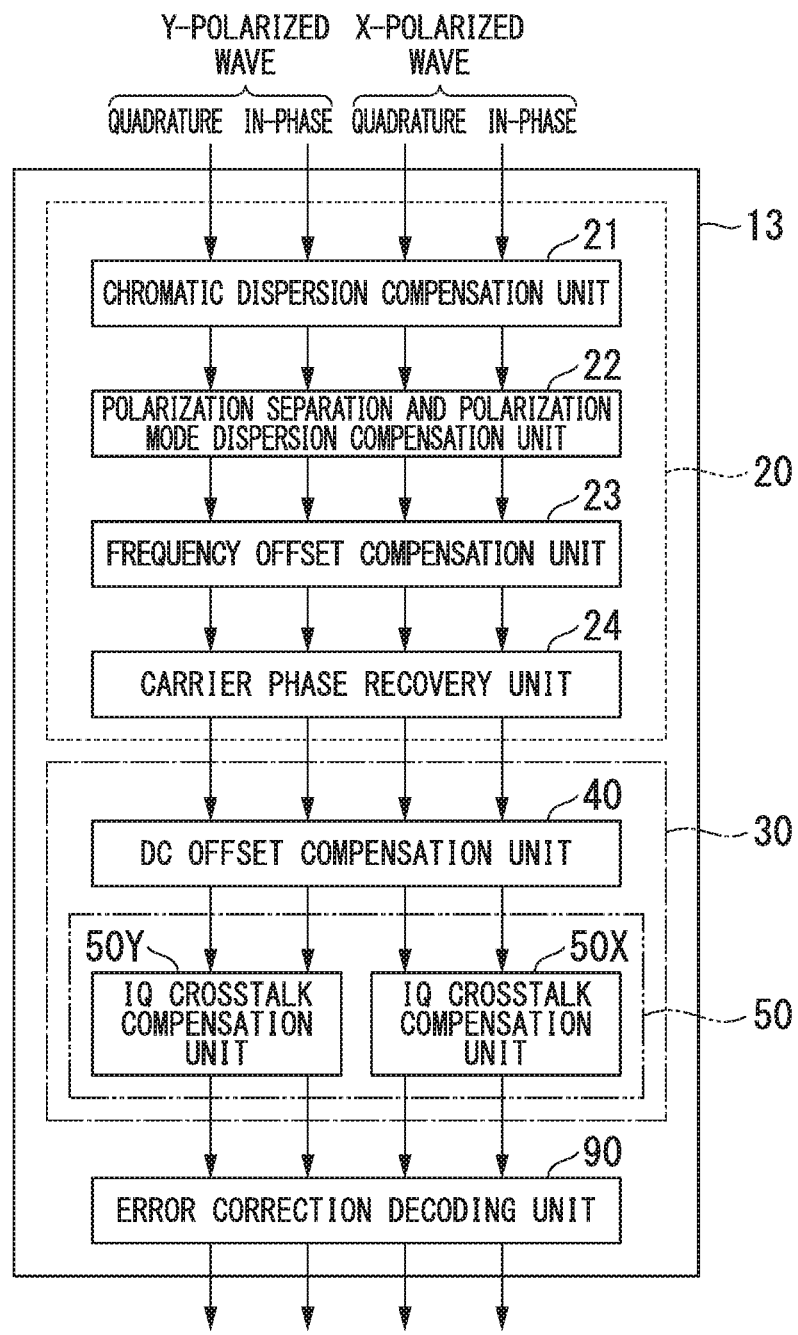
FIG. 2 is a block diagram showing a configuration of a digital signal processing unit according to the embodiment.

FIG. 2 is a block diagram showing an internal configuration of the digital signal processing unit 13. The digital signal processing unit 13 includes a compensation unit 20, a constellation distortion compensation unit 30, and an error correction decoding unit 90.

The compensation unit 20 compensates for an influence of chromatic dispersion and polarization mode dispersion and recovers a carrier (carrier) phase.

The constellation distortion compensation unit 30 compensates for constellation distortion.

The error correction decoding unit 90 performs an error correction decoding process on the digital signal on which the compensation process is performed by the compensation unit 20 and the constellation distortion compensation unit 30, and outputs a resultant signal. As a subsequent circuit serving as an output destination of the error correction decoding unit 90, for example, SerDes (SeRialize/DESerialize) or the like is applied.

Next, a specific configuration of the compensation unit 20 and the constellation distortion compensation unit 30 will be described. First, the compensation unit 20 will be described.

The compensation unit 20 includes a chromatic dispersion compensation unit 21, a polarization separation and polarization mode dispersion compensation unit 22, a frequency offset compensation unit 23, and a carrier phase recovery unit 24.

The chromatic dispersion compensation unit 21 compensates for distortion generated in the received main signal due to chromatic dispersion, for example, using a digital filter. Here, the main signal refers to a time series signal constituting data to be transmitted. In the embodiment, the analog-to-digital converter 12 outputs main signals of 4 lanes, that is, main signals of the in-phase component of the X-polarized wave, the quadrature phase component of the X-polarized wave, the in-phase component of the Y-polarized wave, and the quadrature phase component of the Y-polarized wave to the digital signal processing unit 13, as described above.

The polarization separation and polarization mode dispersion compensation unit 22 separates the optical signal into the X-polarized wave and the Y-polarized wave while tracking a fast polarized-wave state variation of the optical signal in the optical fiber, that is, following the variation, and compensates for dispersion occurring between respective separated polarized-wave modes.

The frequency offset compensation unit 23 compensates for distortion occurring due to a deviation between a frequency of the laser light supplied by the local oscillation laser 11 and a frequency of the laser light supplied by the transmission laser.

The carrier phase recovery unit 24 removes spontaneous emission light noise or laser phase noise generated from an optical amplifier and extracts a correct phase of a carrier, that is, carrier phase. The carrier phase recovery unit 24 outputs the main signals of 4 lanes of which the carrier phase are recovered to the constellation distortion compensation unit 30. As respective functional units of the compensation unit 20, units shown in Non-Patent Document 1 are applied.

Next, the constellation distortion compensation unit 30 will be described.

The constellation distortion compensation unit 30 includes a DC offset compensation unit 40 and an IQ crosstalk compensation unit 50.

Figure 3:
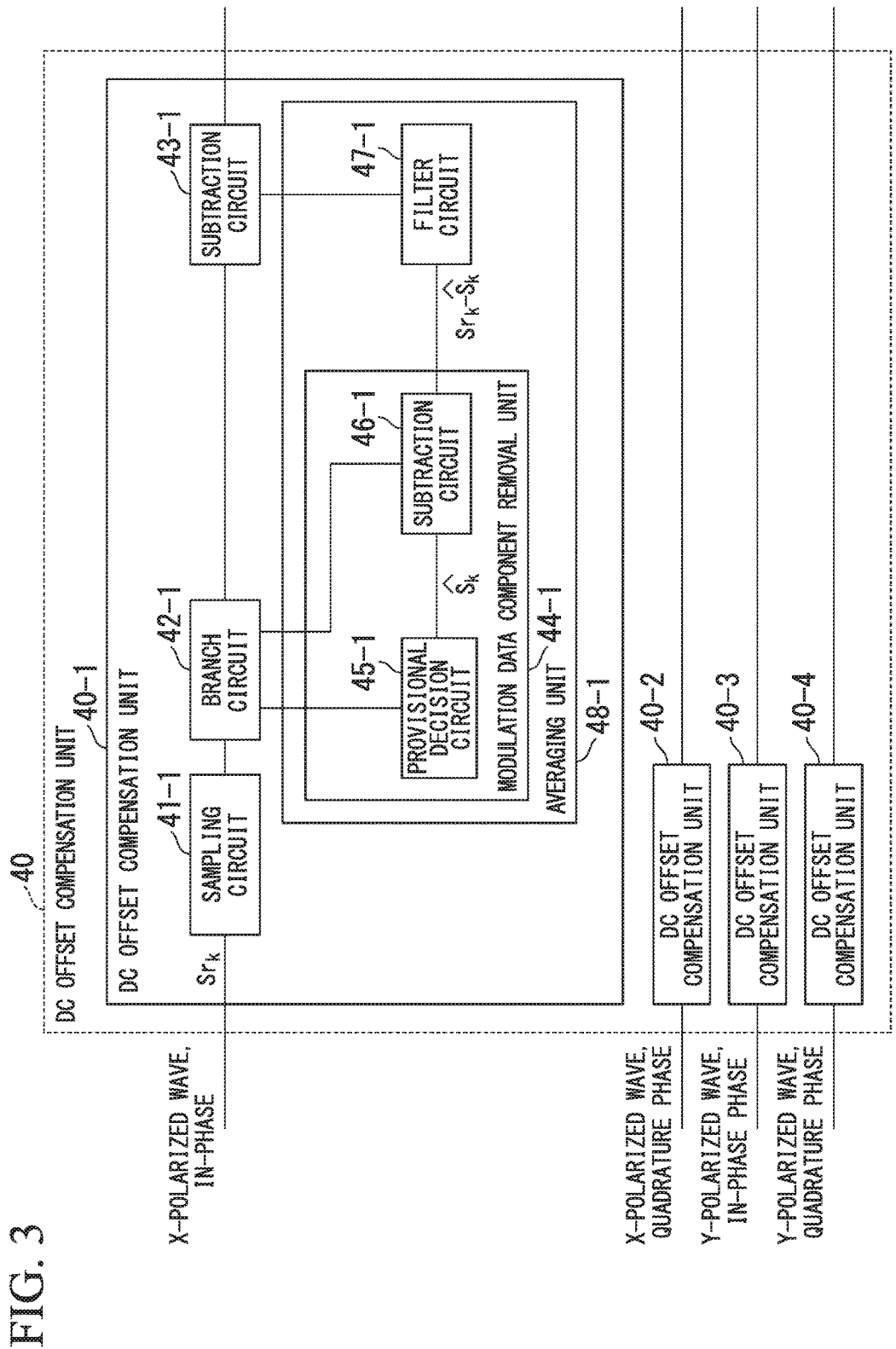
FIG. 3 is a block diagram showing a configuration of a DC offset compensation unit according to the embodiment.

The DC offset compensation unit 40 includes four DC offset compensation units 40-1, 40-2, 40-3, and 40-4 corresponding to the four lanes, as shown in FIG. 3. Each of the four DC offset compensation units 40-1, 40-2, 40-3, and 40-4 independently performs DC offset compensation on a main signal of each of an in-phase component of the X-polarized wave, a quadrature phase component of the X-polarization, an in-phase component of the Y-polarized wave, and a quadrature phase component of the Y-polarization. The DC offset compensation units 40-1, 40-2, 40-3, and 40-4 have the same configuration except that supplied signals are different. Therefore, an internal configuration of the DC offset compensation unit 40-1 that performs the DC offset compensation for the in-phase component of the X-polarization shown in FIG. 3 will be described below by way of example.

The IC offset compensation unit 40-1 includes a sampling circuit 41-1, a branch circuit 42-1, a subtraction circuit 43-1, and an averaging unit 48-1.

The sampling circuit 41-1 samples a part of a time series from the main signal, and outputs the sampled signal.

The branch circuit 42-1 branches and outputs the signal that is output from the sampling circuit 41-1.

The subtraction circuit 43-1 subtracts a DC offset output from the averaging unit 48-1 from the signal output by the branch circuit 42-1, and outputs a result of the subtraction.

The averaging unit 48-1 averages a signal reduced to a level at which a modulation data component is negligible from the branched main signal. The averaging unit 48-1 removes random noise included in the signal through averaging and extracts the DC offset. The averaging unit 48-1 includes a modulation data component removal unit 44-1 and a filter circuit 47-1.

The modulation data component removal unit 44-1 includes a provisional decision circuit 45-1 and a subtraction circuit 46-1.

The provisional decision circuit 45-1 performs a provisional decision of the main signal and extracts the modulation data component. Here, a process of the provisional decision is, for example, a process of performing a decision on the basis of a phase or an amplitude of the main signal and extracting the modulation data component included in the main signal.

The subtraction circuit 46-1 subtracts the modulation data component extracted by the provisional decision from the signal output by the branch circuit 42-1, and outputs a result of the subtraction as an error signal.

The filter circuit 47-1 is, for example, a finite impulse response (FIR) filter, an infinite impulse response (IIR) filter (the IIR filter is also referred to as an exponential weighting filter), or the like. The filter circuit 47-1 performs averaging of the error signal. The filter circuit 47-1 removes random noise in error signal waves included in the error signal through averaging, and extracts the DC offset.

The description of the digital signal processing unit 13 will be continued with reference to FIG. 2.

Figure 4:
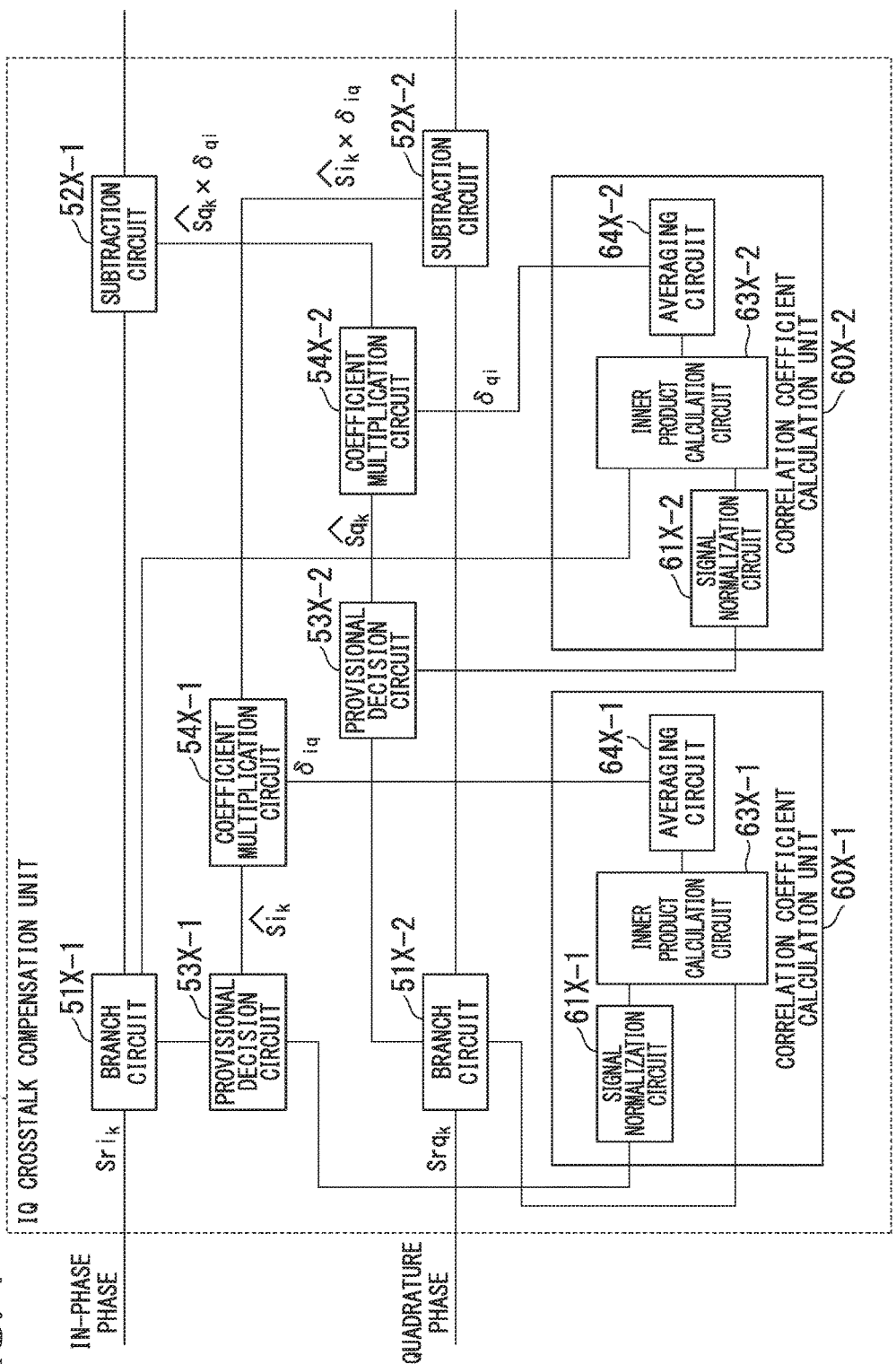
FIG. 4 is a block diagram showing a configuration of an IQ crosstalk compensation unit according to the embodiment.

The IQ crosstalk compensation unit 50 includes an IQ crosstalk compensation unit 50X, and an IQ crosstalk compensation unit 50Y. The IQ crosstalk compensation unit 50X performs IQ crosstalk compensation for the main signal of the in-phase component and the quadrature phase component of the X-polarized wave. The IQ crosstalk compensation unit 50Y performs IQ crosstalk compensation for the main signal of the in-phase component and the quadrature phase component of the Y-polarized wave. FIG. 4 is a block diagram showing an internal configuration of the IQ crosstalk compensation unit 50X. The IQ crosstalk compensation unit 50Y has the same configuration as the IQ crosstalk compensation unit 50X except that the main signal of the in-phase component and the quadrature phase component of the Y-polarized wave is supplied. Hereinafter, a configuration of the IQ crosstalk compensation unit 50X shown in FIG. 4 will be described by way of example.

The IQ crosstalk compensation unit 50X includes a branch circuit 51X-1, a branch circuit 51X-2, a provisional decision circuit 53X-1, a provisional decision circuit 53X-2, a coefficient multiplication circuit 54X-1, a coefficient multiplication circuit 54X-2, a subtraction circuit 52X-1, a subtraction circuit 52X-2, a correlation coefficient calculation unit 60X-1, and a correlation coefficient calculation unit 60X-2.

The branch circuit 51X-1 branches and outputs the main signal of the in-phase position phase component of the X-polarized wave that is output by the DC offset compensation unit 40-1.

The branch circuit 51X-2 branches and outputs the main signal of the quadrature phase component of the X-polarized wave that is output by the DC offset compensation unit 40-2.

The provisional decision circuit 53X-1 (first provisional decision circuit) performs a provisional decision on the main signal of the in-phase component that is output by the branch circuit 51X-1, and extracts a modulation data component of the in-phase.

The provisional decision circuit 53X-2 (second provisional decision circuit) performs a provisional decision on the main signal of the quadrature component that is output by the branch circuit 51X-2, and extracts a quadrature phase modulation data component.

The coefficient multiplication circuit 54X-1 (first coefficient multiplication circuit) multiplies a correlation coefficient (hereinafter referred to as $\delta_{iq}$) output by the correlation coefficient calculation unit 60X-1 by the modulation data component of the in-phase output by the provisional decision circuit 53X-1, and outputs a result of the multiplication. The correlation coefficient ($\delta_{iq}$) output by the correlation coefficient calculation unit 60X-1 indicates a degree of leakage from an in-phase lane to a quadrature phase lane, that is, a correlation between the in-phase component included in the main signal of the quadrature phase component and the main signal of the in-phase component.

The coefficient multiplication circuit 54X-2 (second coefficient multiplication circuit) multiplies a correlation coefficient (hereinafter referred to as $\delta qi$) output by the correlation coefficient calculation unit 60X-2 by the quadrature phase modulation data component output by the provisional decision circuit 53X-2, and outputs a result of the multiplication. The correlation coefficient ($\delta_{qi}$) output from the correlation coefficient calculation unit 60X-2 indicates a degree of leakage from the quadrature phase lane to the in-phase lane, that is, a correlation between the quadrature phase component included in the main signal of the in-phase component and the main signal of the quadrature phase component.

The subtraction circuit 52X-1 (first subtraction circuit) subtracts a multiplication value output by the coefficient multiplication circuit 54X-2 from the main signal of the in-phase component and outputs a result of the subtraction.

The subtraction circuit 52X-2 (second subtraction circuit) subtracts a multiplication value output by the coefficient multiplication circuit 54X-1 from the main signal of the quadrature phase component and outputs a result of the subtraction.

The correlation coefficient calculation unit 60X-1 (first correlation coefficient calculation unit) includes a signal normalization circuit 61X-1, an inner product calculation circuit 63X-1, and an averaging circuit 64X-1.

The signal normalization circuit 61X-1 (first signal normalization circuit) outputs a value obtained by normalizing the modulation data component of the in-phase output from the provisional decision circuit 53X-1, that is, a value obtained by dividing the modulation data component by a square of a magnitude of the in-phase modulation data component.

The inner product calculation circuit 63X-1 (first inner product calculation circuit) calculates an inner product of the output value output from the signal normalization circuit 61X-1 and the main signal of the quadrature phase component output from the branch circuit 51X-2, and outputs an inner product value obtained by the calculation.

The averaging circuit 64X-1 (first averaging circuit) calculates a statistical average of the value output by the inner product calculation circuit 63X-1 and outputs the statistical average to the coefficient multiplication circuit 54X-1.

The correlation coefficient calculation unit 60X-2 (second correlation coefficient calculation unit) includes a signal normalization circuit 61X-2, an inner product calculation circuit 63X-2, and an averaging circuit 64X-2.

The signal normalization circuit 61X-2 (second signal normalization circuit) outputs a value obtained by normalizing the quadrature phase modulation data component output from the provisional decision circuit 53X-2, that is, a value obtained by dividing the modulation data component by a square of a magnitude of the quadrature phase modulation data component.

The inner product calculation circuit 63X-2 (second inner product calculation circuit) calculates an inner product of the output value output from the signal normalization circuit 61X-2 and the main signal of the in-phase component output from the branch circuit 51X-1, and outputs an inner product value obtained by the calculation.

The averaging circuit 64X-2 (second averaging circuit) calculates a statistical average of the value output by the inner product calculation circuit 63X-2 and outputs the statistical average to the coefficient multiplication circuit 54X-2.

(DC offset compensation process)

Next, a DC offset compensation process that is performed in the DC offset compensation unit 40-1 shown in FIG. 3 will be described. A main signal $Sr_k$ of the in-phase component of the X-polarized wave is supplied from the carrier phase recovery unit 24 to the DC offset compensation unit 40-1. The sampling circuit 41-1 outputs a signal obtained by sampling a part of a time series from the main signal $Sr_k$. Here, the main signal $Sr_k$ is a signal expressed by Equation (1) below.

[Math. 1]

$$Sr_k = St_k + d_k + n_k \quad (1)$$

In Equation (1), k indicates a time of a sampled time series discrete signal. The signal $Sr_k$ indicates a k-th reception signal data component. The signal $St_k$ indicates a k-th transmission signal. $d_k$ is a DC offset for the k-th signal. $n_k$ is random noise corresponding to the k-th signal. The provisional decision circuit 45-1 temporarily decides the signal branched by the branch circuit 42-1 and outputs a signal $\hat{S}_k$ (^(head) is on top of S) obtained through the temporary decision.

When a bit error rate (BER) before forward error correction (FEC) is P, a signal $\hat{S}_k$ can be expected to satisfy Equation (2) below with a high probability of about 1−P, that is, about 99% since P is about $10^{-2}$.

[Math. 2]

$$\hat{S}_k \approx St_k \quad (2)$$

Therefore, when the signal $\hat{S}_k$ is subtracted from the signal $Sr_k$, the DC offset and the noise can be extracted from Equations (1) and (2). That is, the subtraction circuit 46-1 subtracts the signal $\hat{S}_k$ output by the provisional decision circuit 45-1 from the signal $Sr_k$ to obtain a sum of a k-th DC offset and the random noise as shown in Equation (3) below.

[Math. 3]

$$Sr_k - \hat{S}_k = d_k + n_k \quad (3)$$

Here, since the noise n is random noise, the random noise can be removed by calculating a statistical average. The filter circuit 47-1 can extract a DC offset d as shown in Equation (4) below by calculating the statistical average.

[Math. 4]

$$\langle Sr_k - \hat{S}_k \rangle = \langle d_k \rangle + \langle n_k \rangle = d \quad (4)$$

Finally, the subtraction circuit 43-1 can obtain a signal of which the DC offset is removed, by subtracting the DC offset d from the signal $Sr_k$ output by the branch circuit 42-1. In fact, the DC offset d is not completely invariant and is assumed to slowly vary with respect to time. When the phase cycle slip in the compensation unit 20 described above has occurred, the DC offset d instantaneously discontinuously changes. Therefore, it is necessary for the statistical averaging process performed by the filter circuit 47-1 to be performed dynamically, not on an entire signal, by an FIR filter or an IIR filter, that is, to be performed to follow a change. As the filter circuit 47-1, a so-called low pass filter (LPF) in which the IIR filter has 1 tap may be applied.

The DC offset compensation units 40-2, 40-3, and 40-4 perform the DC offset compensation process on the main signal of the quadrature phase component of the X-polarized wave, the main signal of the in-phase component of the Y-polarized wave, and the main signal of the quadrature phase component of the Y-polarized wave respectively, similar to the DC offset compensation process that the DC offset compensation unit 40-1 performs on the main signal of the in-phase component of the X-polarized wave. Thus, in the four lanes, the DC offset compensation following a change in the DC offset within each lane is performed.

(IQ Crosstalk Compensation Process)

Next, an IQ crosstalk compensation process in the IQ crosstalk compensation unit 50X shown in FIG. 4 will be described. If signals of the in-phase component and the quadrature phase component of the X-polarized wave supplied to the IQ crosstalk compensation unit 50X are $Sri_k$ and $Srq_k$, the signals are expressed as in Equation (5) and (6) below.

[Math. 5]

$$Sri_k = Sti_k + \delta_{qi} \times Stq_k + n_k \quad (5)$$

[Math. 6]

$$Srq_k = Stq_k + \delta_{iq} \times Sti_k + n_k \quad (6)$$

In Equations (5) and (6), $Sti_k$ and $Stq_k$ are transmission signals of the in-phase lane and the quadrature phase lane, respectively. $\delta_{qi}$ is a degree of leakage from the quadrature phase lane to the in-phase lane as described above, that is, a correlation coefficient indicating a correlation between the quadrature phase component included in the main signal of the in-phase component and the main signal of the quadrature phase component. Further, $\delta_{iq}$ is a degree of leakage from the in-phase lane to the quadrature phase lane as described above, that is, a correlation coefficient indicating a correlation between the in-phase component included in the main signal of the quadrature phase component and the main signal of the in-phase component. $n_k$ is random noise.

The branch circuit 51X-1 branches and outputs the main signal $Sri_k$ of the in-phase component. The provisional decision circuit 53X-1 performs a provisional decision of the main signal $Sri_k$ of the in-phase component that is output by the branch circuit 51X-1 and extracts an in-phase modulation data component $\hat{Si}_k$. The provisional decision circuit 53X-1 outputs the extracted modulation data component $\hat{Si}_k$ to the signal normalization circuit 61X-1 of the correlation coefficient calculation unit 60X-1, and the coefficient multiplication circuits 54X-1.

The branch circuit 51X-2 branches and outputs the main signal $Srq_k$ of the quadrature phase component. The provisional decision circuit 53X-2 performs a provisional decision of the main signal $Srq_k$ of the quadrature phase component that is output by the branch circuit 51X-2 and extracts a quadrature phase modulation data component $\hat{Sq}_k$. The provisional decision circuit 53X-2 outputs the extracted modulation data component $\hat{Sq}_k$ to the signal normalization circuit 61X-2 of the correlation coefficient calculation unit 60X-2, and the coefficient multiplication circuits 54X-2. $Sri_k$ is multiplied by $\hat{S}q_k$ (^(head) is on top of Sq), a result of the multiplication is divided by a norm square of $\hat{S}q_k$, that is, $|\hat{S}q_k|^2$ (^(head) is on top of Sq), and a statistical average of a result of the division is calculated to obtain Equation (7) below.

[Math. 7]

$$\left\langle Sri_k \times \frac{S\hat{q}_k}{|S\hat{q}_k|^2}\right\rangle = \left\langle \frac{Sti_k \times S\hat{q}_k}{|S\hat{q}_k|^2}\right\rangle + \left\langle \frac{\delta_{qi} \times Stq_k \times S\hat{q}_k}{|S\hat{q}_k|^2}\right\rangle + \left\langle \frac{n_k \times S\hat{q}_k}{|S\hat{q}_k|^2}\right\rangle \quad (7)$$

Since the modulation data components $\hat{S}i_k$ and $\hat{S}q_k$ are the same as $Sti_k$ and $Stq_k$ that are the transmission signals with a high probability of about (I-BER) as described above, Equation (8) is satisfied.

[Math. 8]

$$\hat{S}q_k \approx Stq_k \quad (8)$$

Further, since $Sti_k$ and $Stq_k$ are uncorrelated with each other, Equation (9) is satisfied.

[Math. 9]

$$\left\langle \frac{Sti_k \times S\hat{q}_k}{|S\hat{q}_k|^2}\right\rangle = 0 \quad (9)$$

Further, since $n_k$ is random noise, Equation (10) is satisfied.

[Math. 10]

$$\langle n_k \rangle = 0 \quad (10)$$

When Equations (8), (9), and (10) are applied to Equation (7), Equation (11) below is satisfied.

[Math. 11]

$$\left\langle Sri_k \times \frac{S\hat{q}_k}{|S\hat{q}_k|^2}\right\rangle = \delta_{qi} \quad (11)$$

Therefore, the correlation coefficient $\delta_{qi}$ can be calculated on the basis of $Sri_k$ and $\hat{S}q_k$ (^(head) is on top of Sq). That is, the signal normalization circuit 61X-2 of the correlation coefficient calculation unit 60X-2 calculates $\hat{S}q_k/|\hat{S}q_k|^2$ (^(head) is on top of Sq) on the basis of $\hat{S}q_k$ (^(head) is on top of Sq) output by the provisional decision circuit 53X-2. The inner product calculation circuit 63X-2 calculates $Sri_k \times \hat{S}q_k/|\hat{S}q_k|^2$ and outputs a result of the calculation to the averaging circuit 64X-2. The averaging circuit 64X-2 calculates an expression on a left side of Equation (11) and calculates the correlation coefficient $\delta_{qi}$.

The correlation coefficient $\delta_{qi}$ calculated by the correlation coefficient calculation unit 60X-2 in this way is supplied to the coefficient multiplication circuit 54X-2. The coefficient multiplication circuit 54X-2 multiplies $\hat{S}q_k$ (^(head) is on top of Sq) output by the provisional decision circuit 53X-2 by the correlation coefficient $\delta_{qi}$ and outputs a result of the multiplication to the subtraction circuit 52X-1. The subtraction circuit 52X-1 subtracts $\hat{S}q_k \times \delta_{qi}$ (^(head) is on top of Sq) from $Sri_k$ output by the branch circuit 51X-1 and outputs the signal of the in-phase component of the X-polarized wave in which an influence of the IQ crosstalk is compensated for.

Similarly, in the correlation coefficient calculation unit 60X-1, the signal normalization circuit 61X-1 calculates $\hat{S}i_k/|\hat{S}i_k|^2$ (^(head) is on top of Si) on the basis of $\hat{S}i_k$ (^(head) is on top of Si) output by the provisional decision circuit 53X-1. The inner product calculation circuit 63X-1 calculates $Srq_k \times \hat{S}i_k/|\hat{S}i_k|^2$ (^(head) is on top of Si) and outputs a result of the calculation to the averaging circuit 64X-1. The averaging circuit 64X-1 calculates an expression on a left side of Equation (12) and outputs the correlation coefficient $\delta_{iq}$ calculated to the coefficient multiplication circuit 54X-1.

[Math. 12]

$$\left\langle Srq_k \times \frac{S\hat{i}_k}{|S\hat{i}_k|^2}\right\rangle = \delta_{iq} \quad (12)$$

The coefficient multiplication circuit 54X-1 multiplies $\hat{S}i_k$ (^(head) is on top of Si) output by the provisional decision circuit 53X-1 by the correlation coefficient $\delta_{iq}$ and outputs a result of the multiplication to the subtraction circuit 52X-2. The subtraction circuit 52X-2 subtracts $\hat{S}i_k \times \delta_{iq}$ (^(head) is on top of Si) from $Srq_k$ output by the branch circuit 51X-2 and outputs the signal of a quadrature phase component of the X-polarized wave in which an influence of the IQ crosstalk is compensated for.

Similar to the IQ crosstalk compensation process that the IQ crosstalk compensation unit 50X performs on the main signal of the in-phase component and the quadrature phase component of the X-polarized wave, the IQ crosstalk compensation unit 50Y performs the IQ crosstalk compensation process on the main signal of the in-phase component and the quadrature phase component of the Y-polarized wave. Thus, the IQ crosstalk compensation process in all the four lanes is performed.

Figure 5:
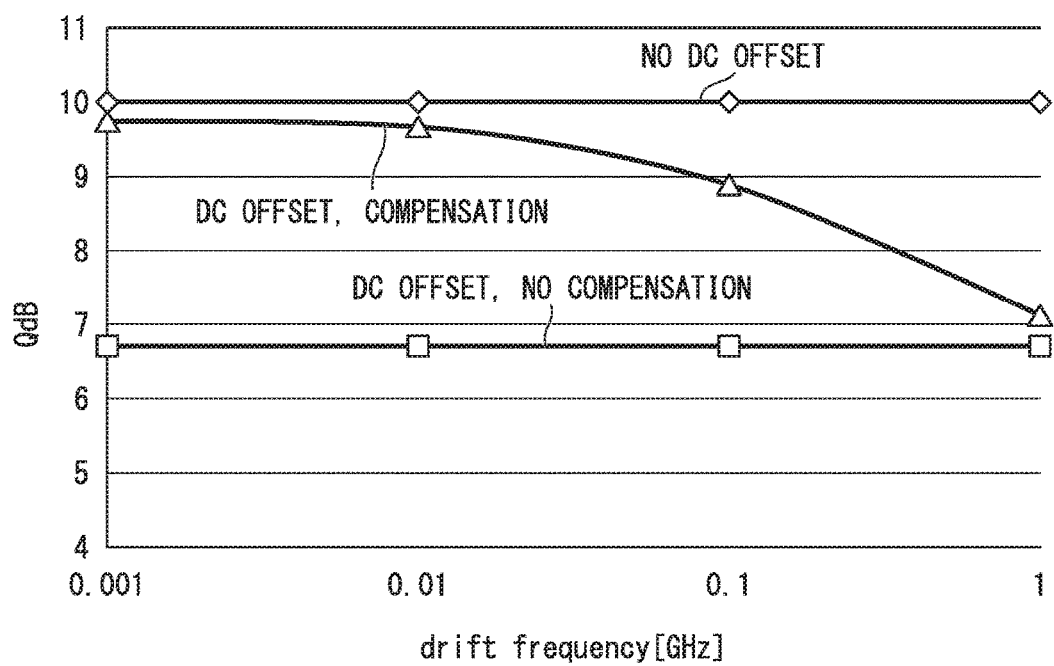
FIG. 5 is a graph showing effects of compensation for a DC offset in simulation on the basis of the embodiment.

FIG. 5 is a graph showing a result of evaluating effects of the DC offset compensation in the DC offset compensation unit 40 according to the embodiment, using Monte Carlo simulation. A dynamically changing DC offset is set as a simulation condition on the assumption that a bias voltage of the optical modulator of the coherent optical transmission device 1 temporally drifts. In FIG. 5, a horizontal axis indicates a drift frequency of the DC offset, and a vertical axis indicates a value called a Q value indicating quality of a reception signal. When DC offset compensation is not applied, a reception Q value decreases by about 3 dB due to a dynamic DC offset. On the other hand, most of the penalty (decrease in the Q value) due to the DC offset can be avoided at most of the drift frequencies by the application of DC offset compensation according to the embodiment. When the DC offset dynamically changes, the DC offset compensation unit 40 can follow change in the DC offset if a frequency of the change is up to about 10 MHz (0.01 GHz).

With the configuration of the above embodiment, for the main signal of the in-phase component of the X-polarized wave, the DC offset compensation unit 40-1 extracts a signal $\hat{S}_k$ of the modulation data component that is substantially the same as the transmission signal using the provisional decision circuit 45-1, subtracts $\hat{S}_k$ from the main signal $Sri_k$ using the subtraction circuit 46-1, and averages a subtraction value using the filter circuit 47-1. Thus, the DC offset can be extracted. The DC offset compensation unit 40-1 can perform the DC offset compensation by subtracting the DC offset from the main signal $Sri_k$ using the subtraction circuit 43-1 to remove the DC offset. The DC offset compensation units 40-2, 40-3, and 40-4 perform DC offset compensation on the quadrature phase component of the X-polarization, the in-phase component of the Y-polarization, and the quadrature phase of the Y-polarization respectively, similar to the DC offset compensation unit 40-1. Accordingly, it is possible to compensate for constellation distortion due to the DC offset only on the reception side, but not on the basis of characteristics of the transmission device such as characteristics or imperfection of an optical modulator on the transmission side. In the coherent detection scheme, there is a problem in that the DC offset compensation cannot be performed by a DC block circuit in an analog electrical stage, but the DC offset compensation can be performed by the configuration of the embodiment, similar to a direct detection type of reception device, even in the coherent optical reception device 3.

Further, with the configuration of the above embodiment, the IQ crosstalk compensation unit 50X extracts modulation data components $\hat{S}i_k$ and $\hat{S}q_k$ that are substantially the same as the transmission signal from the main signals of the in-phase component and the quadrature phase component of the X-polarized wave using the provisional decision circuits 53X-1 and 53X-2. The correlation coefficient calculation unit 60X-1 calculates leakage from the in-phase lane to the quadrature phase lane, that is, $\delta_{iq}$ that is a correlation coefficient indicating a correlation between the in-phase component included in the main signal of the quadrature phase component and the main signal of the in-phase component on the basis of the modulation data components $\hat{S}i_k$ and $\hat{S}q_k$, and outputs the correlation coefficient $\delta_{iq}$ to the coefficient multiplication circuits 54X-1. Further, the correlation coefficient calculation unit 60X-2 calculates leakage from the quadrature phase lane to the in-phase lane, that is, a correlation coefficient $\delta_{qi}$ indicating a correlation between the quadrature phase component included in the main signal of the in-phase component and the main signal of the quadrature phase component, and outputs the correlation coefficient $\delta_{qi}$ to the coefficient multiplication circuits 54X-2. The coefficient multiplication circuit 54X-1 multiplies the in-phase modulation data component $\hat{S}i_k$ by the correlation coefficient $\delta_{iq}$ and outputs a multiplication value to the subtraction circuit 52X-2. The coefficient multiplication circuit 54X-2 multiplies the quadrature phase modulation data component $\hat{S}q_k$ by the correlation coefficient $\delta_{qi}$ and outputs a multiplication value to the subtraction circuit 52X-1. The subtraction circuit 52X-1 can subtract the multiplication value output by the coefficient multiplication circuits 54X-2 from the main signal $Sri_k$ of the in-phase component output by the branch circuit 51X-1 and perform crosstalk compensation for the in-phase component. Further, the subtraction circuit 52X-2 can subtract the multiplication value output by the coefficient multiplication circuits 54X-1 from the main signal $Srq_k$ of the quadrature phase component output by the branch circuit 51X-2 and perform crosstalk compensation for the quadrature phase component. The IQ crosstalk compensation unit 50Y can perform compensation for the IQ crosstalk by performing the same IQ crosstalk compensation process as the IQ crosstalk compensation unit 50X on the in-phase component and the quadrature phase component of the Y-polarized wave. Accordingly, it is possible to compensate for constellation distortion due to the IQ crosstalk only on the reception side, but not on the basis of characteristics of the transmission device such as characteristics or imperfection of an optical modulator on the transmission side.

When a multiple value of a multi-level modulation scheme to be applied is increased from QPSK of polarized-wave multiplexing to 16QAM or 64QAM, a distance between signal points decreases, and slight distortion of a signal point arrangement causes a symbol error. Therefore, it is known that, as the multiple value is increased, an influence of constellation distortion due to the DC offset or the IQ crosstalk increases and there is an influence on the bit error rate that is not negligible. With the configuration of the embodiment described above, it is possible to perform the compensation for the constellation distortion and to reduce the bit error rate of transferred data even when the multi-level modulation scheme is applied, as described above.

Further, since the configuration of the above embodiment adaptively performs the DC offset compensation process or the IQ crosstalk compensation process on the basis of the main signal received in the coherent optical reception device 3, it is not necessary for characteristics of the optical modulator of the coherent optical transmission device 1 to be measured in advance. Further, the configuration of the embodiment is capable of compensating for the constellation distortion if a variation in the constellation distortion is gradual with respect to a symbol rate even when the constellation distortion changes with time. Further, the configuration of the embodiment exhibits particularly excellent effects in 16QAM or more multi-level modulation.

Further, a coherent detection type reception device includes a device having a configuration including the DC offset compensation unit 40 between the chromatic dispersion compensation unit 21 and the polarization separation and polarization mode dispersion compensation unit 22. However, the device performs only compensation for the DC offset occurring in a section from a mixing unit 10 which the local oscillation laser 11 and the coherent optical reception front-end unit 10 are connected, to the analog-to-digital converter 12. On the other hand, since the configuration of the above embodiment includes the DC offset compensation unit 40 after the carrier phase recovery unit 24, the configuration can perform not only the compensation for the DC offset occurring in the section from the mixing unit 10 which the local oscillation laser 11 and the coherent optical reception front-end unit 10 are connected, to the analog-to-digital converter 12, but also compensation for the DC offset caused by an influence of an extinction ratio of the optical modulator of the coherent optical transmission device 1.

Figure 6A:
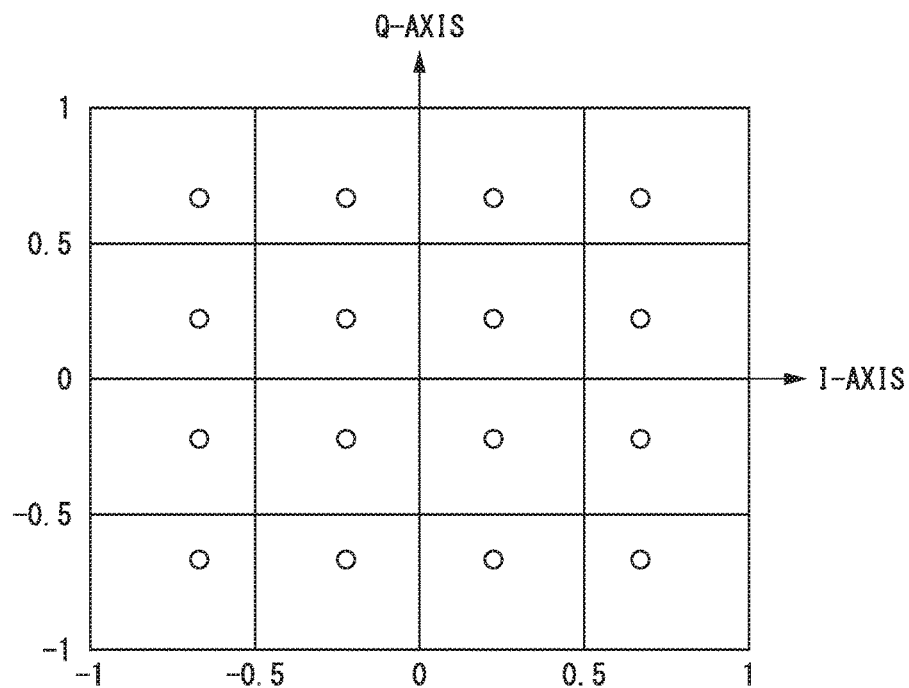
FIG. 6A is a diagram showing an example of a constellation when an optical signal is a polarized-wave multiplexing 16QAM signal.
Figure 6B:
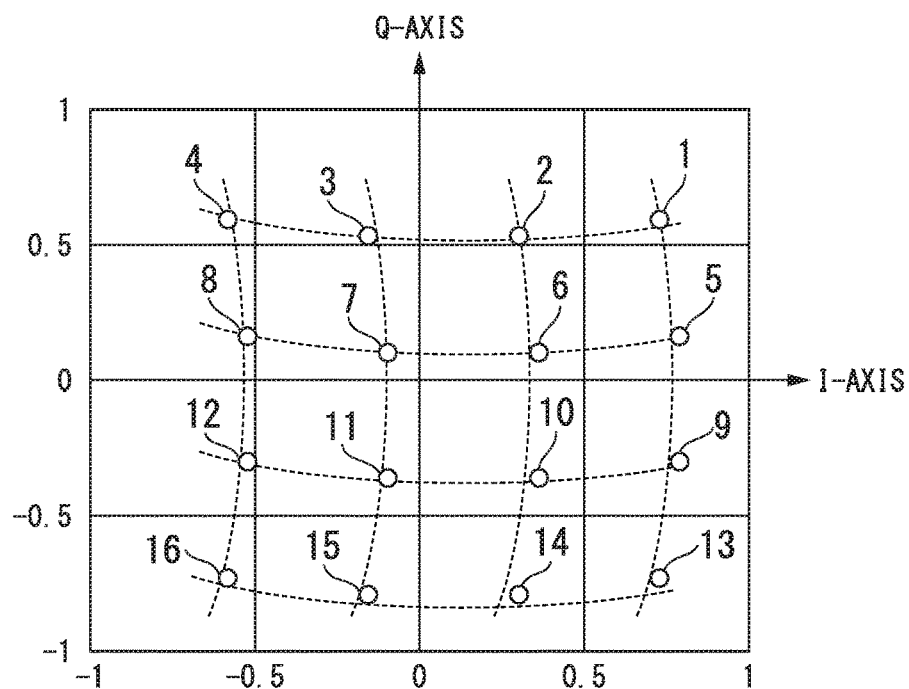
FIG. 6B is a diagram showing an example of constellation distortion when an optical signal is a polarized-wave multiplexing 16QAM signal.

The constellation of the optical signal received by the coherent optical reception device 3 is distorted due to the DC offset generated by the imperfection of the polarized-wave multiplexing IQ modulator included in the coherent optical transmission device 1. An example of the constellation distortion when the optical signal transmitted from the coherent optical transmission device 1 is the polarized-wave multiplexing 16QAM signal will be described with reference to FIGS. 6A and 6B. In an ideal 16QAM signal in which the DC offset is not generated, the constellation of the reception signal is displayed in a square lattice form on the IQ plane, as shown in FIG. 6A. However, in the 16QAM signal affected by DC offset generated due to the extinction ratio of the polarized-wave multiplexing IQ modulator being not infinite, the constellation of the reception signal is distorted as shown in FIG. 6B. That is, signals (respective signals denoted with reference signs 5 to 12 in FIG. 6B) located near an I-axis are distorted so that an amplitude of the in-phase component is attracted to the positive side (rightward in FIG. 6B). Signals (respective signals denoted with reference signs 2, 3, 6, 7, 10, 11, 14, and 15 in FIG. 6B) located near a Q axis are distorted so that an amplitude of the quadrature phase component is attracted to the negative side (downward in FIG. 6B). Here, the constellation shown in FIG. 6B is a result of computer simulation on the assumption that the extinction ratio of the polarized-wave multiplexing IQ modulator is 15 dB.

FIG. 7 is a diagram schematically showing a signal of the in-phase component (I component) of the X-polarized wave or the Y-polarized wave that is input to the DC offset compensation unit 40.

In FIG. 7, a horizontal axis indicates time and a vertical axis indicates amplitude. Signals denoted with references signs 1 to 16 shown in FIG. 7 correspond to signals denoted with the same reference signs in the constellation in FIG. 6B, respectively. Hereinafter, a relationship between the respective signals denoted with reference signs 1, 5, 9, and 13 will be described. For other signal groups (reference signs 2, 6, 10, and 14, reference signs 3, 7, 11, and 15, and reference signs 4, 8, 12, and 16), the same relationship as a relationship between the respective signals denoted with the reference signs 1, 5, 9, and 13 is established.

The respective signals denoted with reference signs 5 and 9 should have the same amplitude as the signals denoted with reference signs 1 and 13, but in fact, the amplitude of the respective signals denoted with reference signs 5 and 9 is greater than the amplitude of the respective signals denoted with reference signs 1 and 13. Here, a dash-dotted line in FIG. 7 indicates an amplitude of the signal of the in-phase component when the constellation distortion does not occur (that is, constellation of FIG. 6A). Alternatively, the dash-dotted line is said to indicate the amplitude of the signal $St_k$ in Equation (1) above. From FIG. 7, it can be seen that the DC offset $d_k$ relatively greater than the respective signals denoted with reference signs 1 and 13 is added to the respective signals denoted with reference signs 5 and 9. The DC offset d ($\approx \langle d_k \rangle$) derived using Equation (4) above is an average value of the respective DC offsets $d_k$ added to the respective signals denoted with the reference signs 1, 5, 9, and 13. The DC offset compensation unit 40 shown in FIG. 3 compensates for the respective signals denoted with the reference signs 1, 5, 9, and 13 using the DC offset d ($\approx \langle d_k \rangle$) derived by averaging. However, if the constellation distortion is considered, it is preferable that compensation is performed on the respective signals denoted with reference signs 5 and 9 using a value greater than the DC offset d, and compensation is performed on the respective signals denoted with reference signs 1 and 13 using a value smaller than the DC offset d.

Here, referring to FIG. 6B, it can be seen that respective signals denoted by reference signs 5 to 12 to which a relatively great DC offset $d_k$ is added among the signals of the in-phase component are signals located near an I-axis of the constellation. The signals located near the I-axis are signals in which an amplitude of which an absolute value is small in four-level amplitude modulation is applied to the quadrature phase component (Q component). On the other hand, respective signals denoted by reference signs 1 to 4 and 13 to 16 to which a relatively small DC offset $d_k$ is added are signals in which an amplitude of which an absolute value is great in the four-level amplitude modulation is applied to the quadrature phase component. Therefore, for the signal of the in-phase component, the DC offset value used for compensation may be adjusted according to the amplitude of the corresponding quadrature component.

Figure 8:
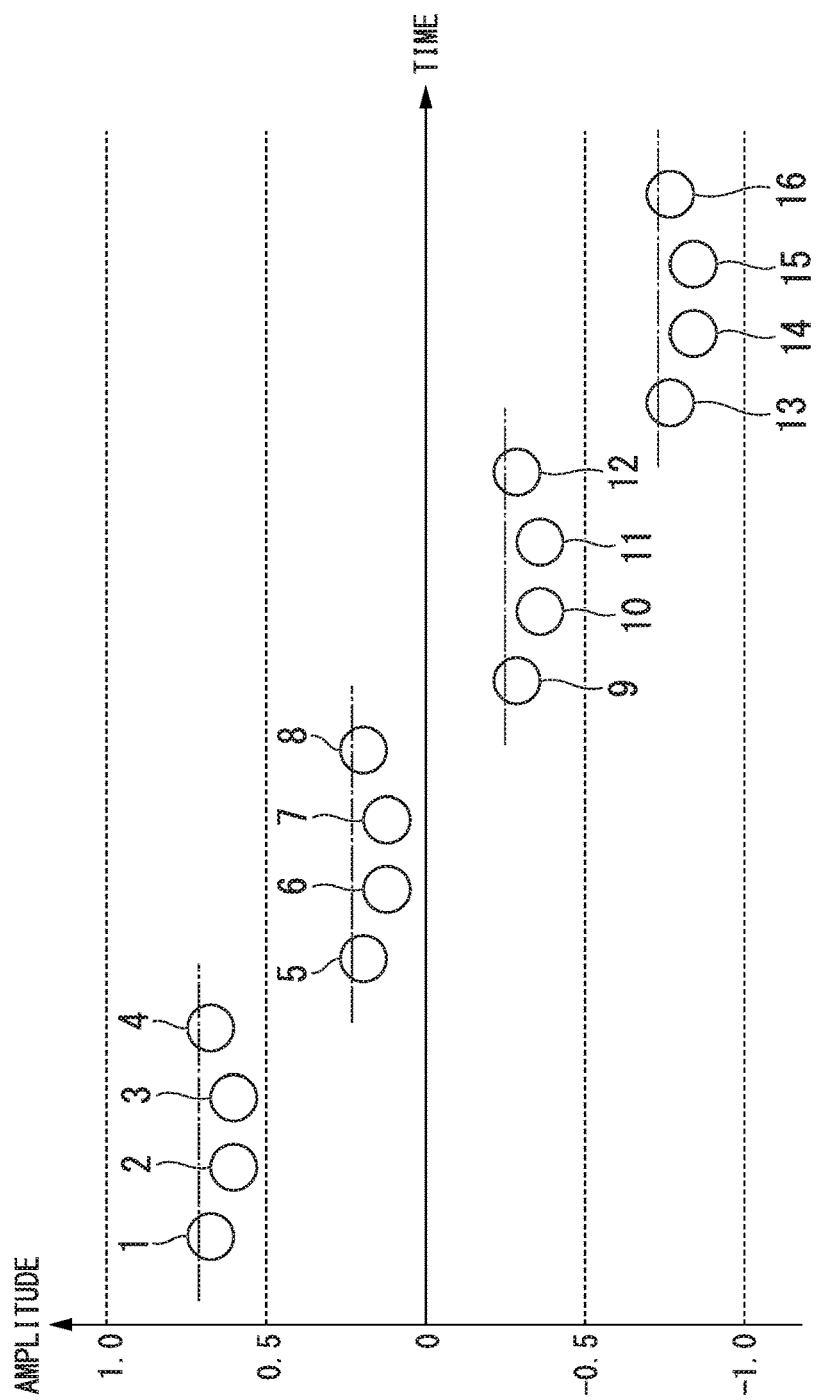
FIG. 8 is a diagram schematically showing a signal of a quadrature phase component (Q component) of an X-polarized wave or a Y-polarized wave input to the DC offset compensation unit.

The same relationship as in the above description holds with respect to the quadrature phase component. FIG. 8 is a diagram schematically showing a signal of the quadrature phase component (Q component) of the X-polarized wave or the Y-polarized wave input to the DC offset compensation unit 40.

The horizontal axis in FIG. 8 indicates time and the vertical axis indicates amplitude. Signals denoted with reference signs 1 to 16 shown in FIG. 8 correspond to signals denoted with the same reference signs in the constellation of FIG. 6B, respectively. A dash-dotted line in FIG. 8 indicates an amplitude of the signal of the quadrature phase component when the constellation distortion does not occur (that is, the constellation in FIG. 6A). From FIG. 8, it can be seen that a DC offset $d_k$ having a negative value is added to the respective signals of the quadrature phase components. For example, it can be seen that the DC offset $d_k$ having a relatively large absolute value is added to the respective signals denoted with the reference signs 2, 3, 6, 7, 10, 11, 14, and 15. Therefore, the DC offset value used for compensation may be adjusted with respect to the signal of the quadrature phase component according to the amplitude of the corresponding in-phase component.

A configuration in which the DC offset value used for compensation as described above is adjusted will be described with reference to FIG. 9.

Figure 9:
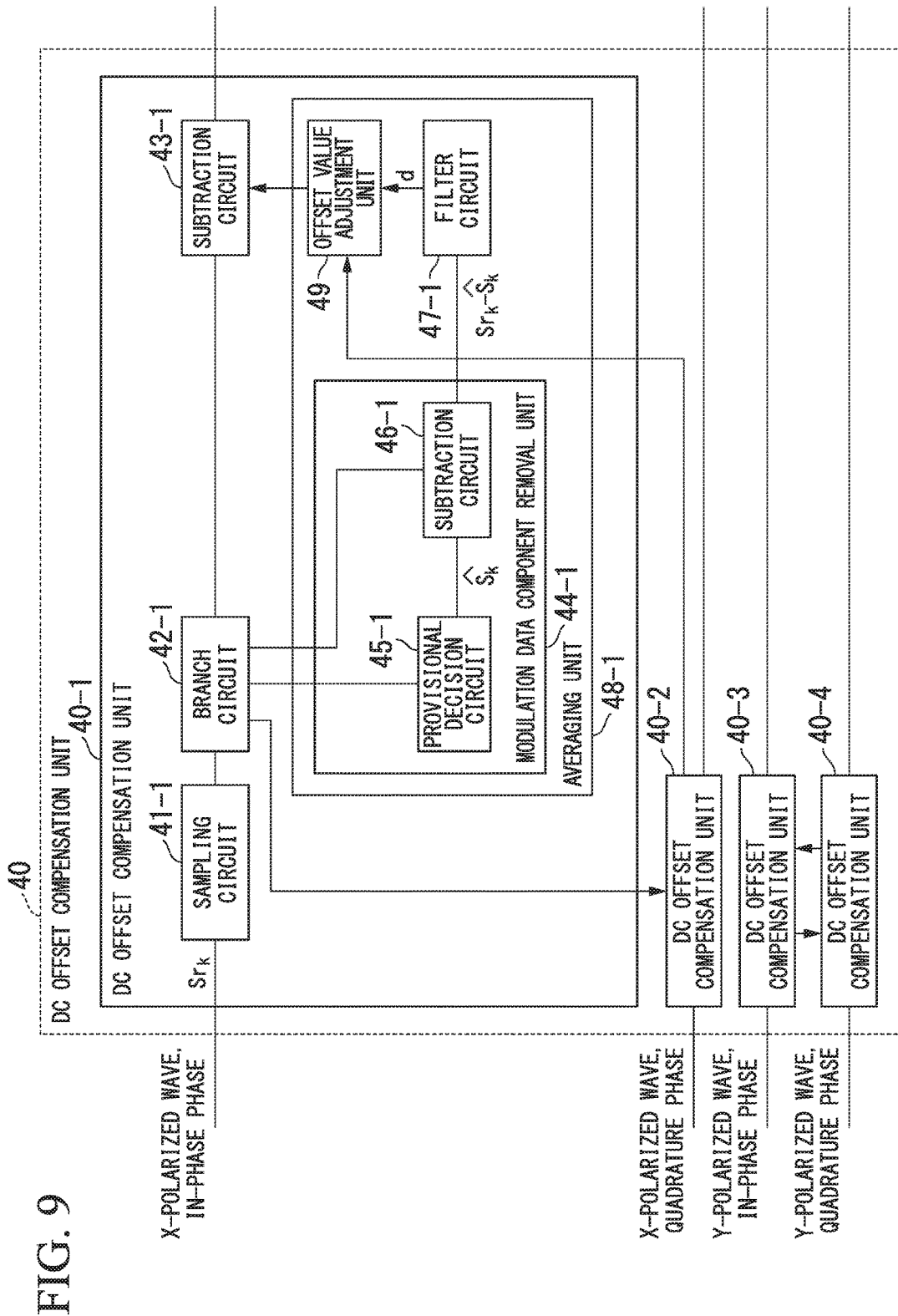
FIG. 9 is a block diagram showing a configuration of the DC offset compensation unit according to a modification example.

FIG. 9 is a block diagram showing a configuration of the DC offset compensation unit 40 according to a modification example. A difference between the DC offset compensation unit 40 shown in FIG. 3 and the DC offset compensation unit 40 shown in FIG. 9 is that the offset value adjustment unit 49 is included in each of the DC offset compensation units 40-1, 40-2, 40-3, and 40-4 shown in FIG. 9. Hereinafter, only differences from the DC offset compensation unit 40 shown in FIG. 3 will be described.

The branch circuit 42-1 included in the DC offset compensation unit 40-1 branches and outputs the main signal of the in-phase component of the X-polarized wave output by the sampling circuit 41-1. For example, the branch circuit 42-1 outputs the main signal of the in-phase component of the X-polarized wave to the offset value adjustment unit 49 included in the DC offset compensation unit 40-2. The branch circuit included in the DC offset compensation unit 40-3 branches and outputs the main signal of the in-phase component of the Y-polarized wave output by the sampling circuit included in the DC offset compensation unit 40-3, similar to the branch circuit 42-1. For example, the branch circuit included in the DC offset compensation unit 40-3 outputs the main signal of the in-phase component of the Y-polarized wave to the offset value adjustment unit 49 included in the DC offset compensation unit 40-4.

The branch circuit included in the DC offset compensation unit 40-2 branches and outputs the main signal of the quadrature phase component of the X-polarized wave output by the sampling circuit included in the DC offset compensation unit 40-2. For example, the branch circuit included in the DC offset compensation unit 40-2 outputs the main signal of the quadrature phase component of the X-polarized wave to the offset value adjustment unit 49 included in the DC offset compensation unit 40-1. The branch circuit included in the DC offset compensation unit 40-4 branches and outputs the main signal of the quadrature phase component of the Y-polarized wave output by the sampling circuit included in the DC offset compensation unit 40-4, similar to the branch circuit included in the DC offset compensation unit 40-2. For example, the branch circuit included in the DC offset compensation unit 40-4 outputs the main signal of the quadrature phase component of the Y-polarized wave to the offset value adjustment unit 49 included in the DC offset compensation unit 40-3.

The offset value adjustment unit 49 adjusts the value of the DC offset d applied to (subtracted from) the main signal of the in-phase component of the X-polarized wave and/or the Y-polarized wave, according to the amplitude of the corresponding quadrature phase component. Further, the offset value adjustment unit 49 adjusts the value of the DC offset d applied to (subtracted from) the signal of the quadrature phase component of the X-polarized wave and/or the Y-polarized wave, according to the amplitude of the corresponding in-phase component. More particularly, the DC offset compensation unit 40-1 includes the offset value adjustment unit 49 that adjusts the value of the DC offset d applied to (subtracted from) the signal of the in-phase component of the X-polarized wave, according to the amplitude of the corresponding quadrature phase component. The DC offset compensation unit 40-2 includes the offset value adjustment unit 49 that adjusts the value of the DC offset d applied to (subtracted from) the signal of the quadrature phase component of the X-polarized wave, according to the amplitude of the corresponding in-phase component. The DC offset compensation unit 40-3 includes the offset value adjustment unit 49 that adjusts the value of the DC offset d applied to (subtracted from) the signal of the in-phase component of the Y-polarized wave, according to the amplitude of the corresponding quadrature phase component. The DC offset compensation unit 40-4 includes the offset value adjustment unit 49 that adjusts the value of the DC offset d applied to (subtracted from) the signal of the quadrature phase component of the Y-polarized wave, according to the amplitude of the corresponding in-phase component. Further, respective signals are independent between the X-polarized wave and the Y-polarized wave.

The offset value adjustment unit 49 included in the DC offset compensation unit 40-1 corresponding to the in-phase component of the X-polarized wave receives the main component signal $Sr_k$ of the quadrature phase component of the X-polarized wave output from the branch circuit of the DC offset compensation unit 40-2 and the DC offset d according to the in-phase component derived by the filter circuit 47-1. The offset value adjustment unit 49 included in the DC offset compensation unit 40-1 performs the following process on the input DC offset d. When the absolute value of the amplitude of the main signal $Sr_k$ of the corresponding quadrature component is smaller than a predetermined threshold value, the offset value adjustment unit 49 outputs a value (hereinafter referred to as a "wl multiplication value") (first multiplication value) obtained by multiplying the DC offset d by a predetermined weighting coefficient wl (first weighting coefficient) greater than 1 to the subtraction circuit 43-1. On the other hand, when the absolute value of the amplitude of the main signal $Sr_k$ of the corresponding quadrature component is equal to or greater than the predetermined threshold value, the offset value adjustment unit 49 outputs a value (hereinafter referred to as a "ws value") (second multiplication value) obtained by multiplying the DC offset d by a predetermined weighting coefficient ws (second weighting coefficient) smaller than 1 to the subtraction circuit 43-1. Here, the weighting coefficient is a coefficient that satisfies a relationship of wl>1>ws>0.

The offset value adjustment unit 49 included in the DC offset compensation unit 40-3 corresponding to the in-phase component of the Y-polarized wave is also the same as the offset value adjustment unit 49 included in the DC offset compensation unit 40-1. Specifically, the main signal of the quadrature phase component of the Y-polarized wave output from the DC offset compensation unit 40-4 and the DC offset d according to the in-phase component derived by the filter circuit included in the DC offset compensation unit 40-3 are input to the offset value adjustment unit 49 included in the DC offset compensation unit 40-3. The offset value adjustment unit 49 included in the DC offset compensation unit 40-3 performs the same process as in the DC offset compensation unit 40-1 on the input DC offset d.

The offset value adjustment unit 49 included in the DC offset compensation unit 40-2 corresponding to the quadrature phase component of the X-polarized wave receives the main signal $Sr_k$ of the in-phase component of the X-polarized wave output from the branch circuit 42-1 of the DC offset compensation unit 40-1 and the DC offset d according to the quadrature phase component derived by the filter circuit. The offset value adjustment unit 49 included in the DC offset compensation unit 40-2 performs the following process on the input DC offset d. When the absolute value of the amplitude of the main signal $Sr_k$ of the corresponding in-phase component is smaller than the predetermined threshold value, the offset value adjustment unit 49 outputs a wl multiplication value obtained by multiplying the DC offset d by a predetermined weighting coefficient wl greater than 1 to the subtraction circuit. On the other hand, when the absolute value of the amplitude of the main signal $Sr_k$ of the corresponding in-phase component is equal to or greater than the predetermined threshold value, the offset value adjustment unit 49 outputs a ws multiplication value obtained by multiplying the DC offset d by a predetermined weighting coefficient ws smaller than 1 to the subtraction circuit.

The offset value adjustment unit 49 included in the DC offset compensation unit 40-4 corresponding to the quadrature phase component of the Y-polarized wave is also the same as the offset value adjustment unit 49 included in the DC offset compensation unit 40-2. Specifically, the main signal of the in-phase component of the Y-polarized wave output from the DC offset compensation unit 40-3 and the DC offset d according to the quadrature phase component derived by the filter circuit included in the DC offset compensation unit 40-4 are input to the offset value adjustment unit 49 included in the DC offset compensation unit 40-4. The offset value adjustment unit 49 included in the DC offset compensation unit 40-4 performs the same process as in the DC offset compensation unit 40-2 on the input DC offset d.

With the configuration described above, the coherent optical reception device 3 can perform appropriate DC offset compensation according to each symbol of a reception signal.

Figure 10:
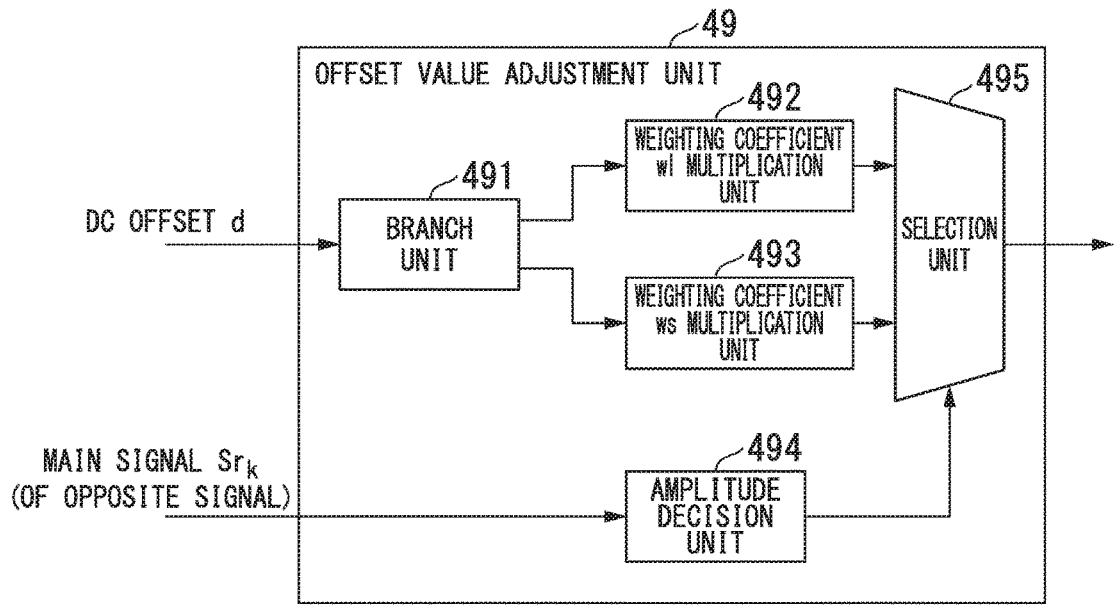
FIG. 10 is a block diagram showing a configuration example of an offset value adjustment unit.

FIG. 10 is a diagram showing a configuration example of the offset value adjustment unit 49.

The offset value adjustment unit 49 includes a branch unit 491, a weighting coefficient wl multiplication unit 492, a weighting coefficient ws multiplication unit 493, an amplitude decision unit 494, and a selection unit 495. The offset value adjustment unit 49 included in the DC offset compensation unit 40-1 will be described by way of example with reference to FIG. 10. The offset value adjustment units 49 included in the DC offset compensation units 40-2, 40-3, and 40-4 also perform the same process as in the offset value adjustment unit 49 included in the DC offset compensation unit 40-1.

The branch unit 491 branches the DC offset d output by the filter circuit 47-1 into two and outputs the respective DC offsets to the weighting coefficient wl multiplication unit 492 and the weighting coefficient ws multiplication unit 493. The weighting coefficient wl multiplication unit 492 multiplies the input DC offset d by a weighting coefficient wl to calculate a wl multiplication value. The weighting coefficient wl multiplication unit 492 outputs the wl multiplication value to the selection unit 495. The weighting coefficient ws multiplication unit 493 multiplies the input DC offset d by a weighting coefficient ws to calculate a ws multiplication value. The weighting coefficient ws multiplication unit 493 outputs the ws multiplication value to the selection unit 495. The amplitude decision unit 494 decides a magnitude relationship between an absolute value (|E|) of the amplitude of the main signal $Sr_k$ of the quadrature phase component of the X-polarized wave output from the branch circuit of the DC offset compensation unit 40-2 and a predetermined threshold value (Eth). The amplitude decision unit 494 outputs a signal indicating a result of the decision to the selection unit 495.

The selection unit 495 outputs the w1 multiplication value that is the output of the weighting coefficient w1 multiplication unit 492 as it is, when the absolute value (|E|) of the amplitude of the main signal $Sr_k$ of the quadrature phase component of the X-polarized wave output from the branch circuit of the DC offset compensation unit 40-2 is smaller than the predetermined threshold value (Eth) on the basis of the signal output by the amplitude decision unit 494. On the other hand, the selection unit 495 outputs the ws multiplication value that is the output of the weighting coefficient ws multiplication unit 493 as it is, when the absolute value (|E|) of the amplitude of the main signal $Sr_k$ of the quadrature phase component of the X-polarized wave output from the branch circuit of the DC offset compensation unit 40-2 is greater than the predetermined threshold value (Eth) on the basis of the signal output by the amplitude decision unit 494. Although an aspect in which both of the weighting coefficient w1 multiplication unit 492 and the weighting coefficient ws multiplication unit 493 are included in the offset value adjustment unit 49 is described in FIG. 10, an aspect in which only one of both is included according to a state of constellation distortion may be adopted. For example, when the absolute value (|E|) of the amplitude of an opposite signal is greater than the predetermined threshold value (Eth), it is not necessary to adjust the DC offset d. In such a case, the offset value adjustment unit 49 may directly connect the output that is not input to the weighting coefficient w1 multiplication unit 492 among two outputs of the branch unit 491 to the selection unit 495 without including the weighting coefficient ws multiplication unit 493 included therein. In this case, the weighting coefficient ws may be regarded as ws=1. In the above description, although a representation "opposite" has been used, the representation means the quadrature phase component of the X-polarized wave with respect to the in-phase component of the X-polarized wave and means the quadrature phase component of the Y-polarized wave with respect to the in-phase component of the Y-polarized wave.

Figure 11:
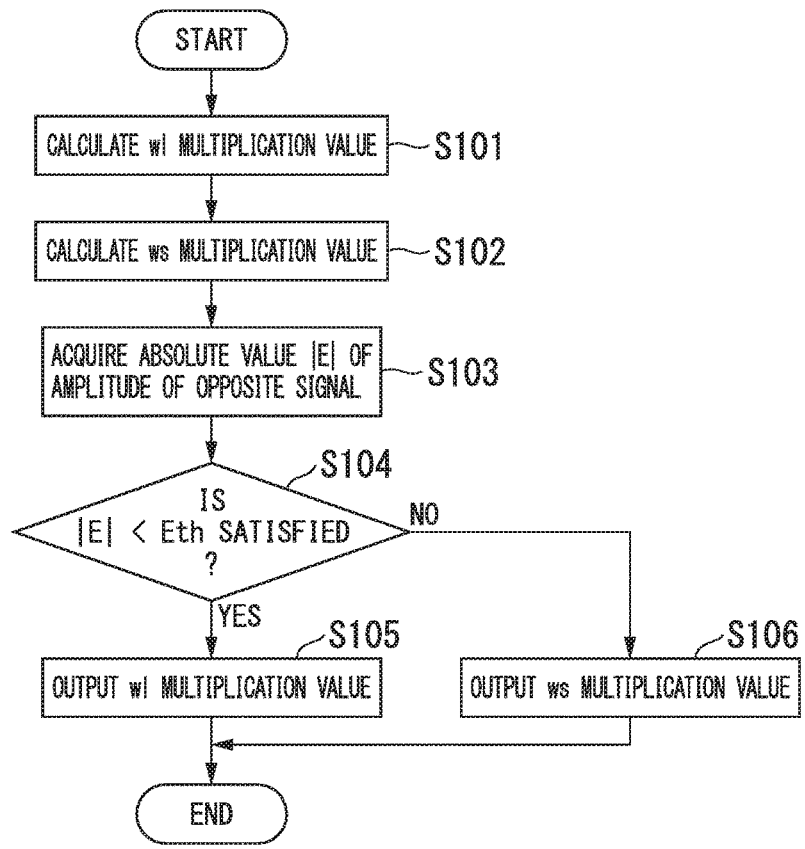
FIG. 11 is a flowchart showing a process of the offset value adjustment unit.

FIG. 11 is a flowchart showing a flow of a process of the offset value adjustment unit 49. A process of the offset value adjustment unit 49 included in the DC offset compensation unit 40-1 will be described by way of example with reference to FIG. 11.

The branch unit 491 outputs the DC offset d output from the filter circuit 47-1 to the weighting coefficient w1 multiplication unit 492 and the weighting coefficient ws multiplication unit 493. The weighting coefficient w1 multiplication unit 492 multiplies the DC offset d output from the branch unit 491 by the weighting coefficient w1 to calculate a w1 multiplication value (step S101). The weighting coefficient w1 multiplication unit 492 outputs the calculated w1 multiplication value to the selection unit 495. The weighting coefficient ws multiplication unit 493 multiplies the DC offset d output from the branch unit 491 by the weighting coefficient ws to calculate a ws multiplication value (step S102). The weighting coefficient ws multiplication unit 493 outputs the calculated ws multiplication value to the selection unit 495. Here, the weighting coefficients w1 and ws may be coefficients sufficient to compensate for the distorted constellation in FIG. 6B in a square lattice shape. The constellation distortion is different according to the characteristics of a polarized-wave multiplexing IQ optical modulator used for the coherent optical transmission device 1, characteristics of the optical fiber 2 that is a propagation path of an optical signal, or the like. Weighting coefficients w1 and ws having appropriate numerical values may be set in the offset value adjustment unit 49 in advance.

When the DC offset d is input from the filter circuit 47-1, the amplitude decision unit 494 acquires an absolute value |E| of the amplitude of the main signal $Sr_k$ of the quadrature phase component of the opposite X-polarized wave (step S103). The amplitude decision unit 494 compares the acquired absolute value |E| of the amplitude of the main signal $Sr_k$ with the predetermined threshold value Eth to determine whether or not the absolute value |E|<predetermined threshold value Eth (step S104). The predetermined threshold value Eth is a threshold value for distinguishing whether the amplitude of the opposite signal is any amplitude in the four-level amplitude modulation. For example, an amplitude E of a signal of a certain lane may be assumed to be amplitude-modulated with the 4 levels −E2, −E1, E1, and E2 (0<E1<E2). The threshold value Eth may be a value close to the middle between E1 and E2, and may be a value with which E1 and E2, and −E1 and −E2 can be appropriately distinguished. When the absolute value |E|<the predetermined threshold value Eth is satisfied (step S104—YES), the selection unit 495 outputs the w1 multiplication value output from the weighting coefficient w1 multiplication unit 492 to the subtraction circuit 43-1 (step S105). On the other hand, when the absolute value |E|<the predetermined threshold value Eth is not satisfied (step S104—NO), the selection unit 495 outputs the ws multiplication value output from the weighting coefficient ws multiplication unit 493 to the subtraction circuit 43-1 (step S106).

Figure 12:
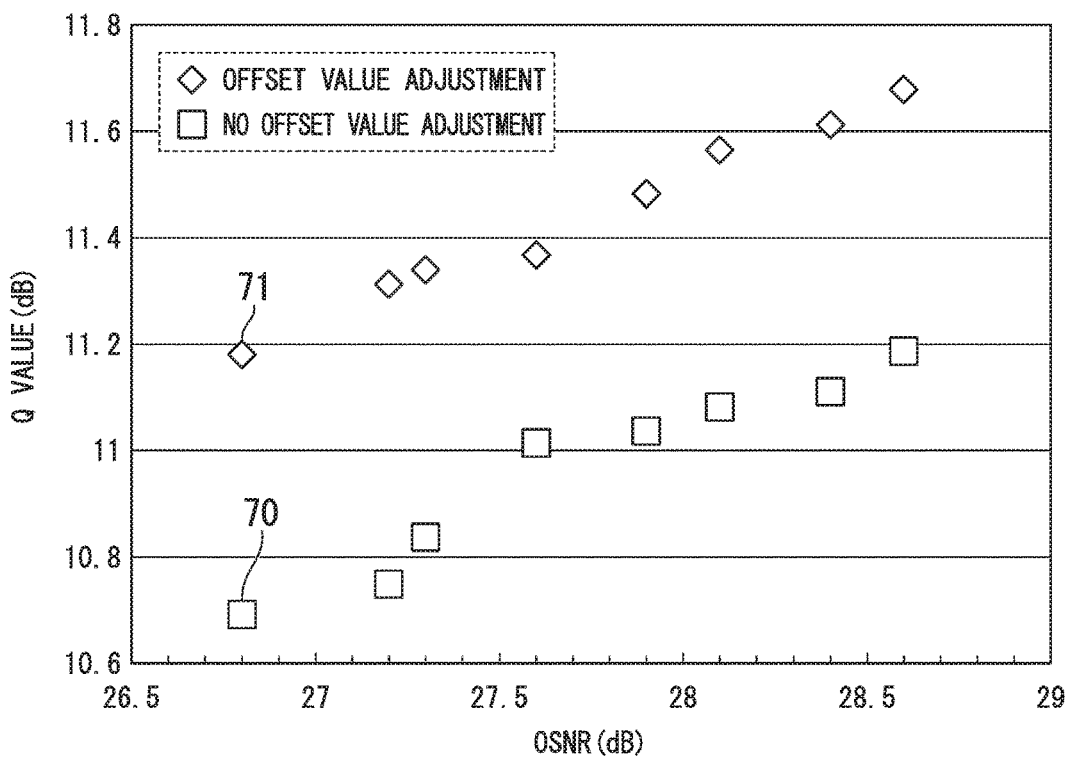
FIG. 12 is a graph showing results of computer simulation performed in order to verify effects when an offset value adjustment unit is provided in the DC offset compensation unit.

FIG. 12 is a graph showing results of computer simulation performed to verify effects when the offset value adjustment unit 49 is provided in the DC offset compensation unit 40. The horizontal axis indicates a signal-to-noise ratio (OSNR: Optical Signal-to-Noise Ratio) due to the intensity of optical signal output from the coherent optical transmission device 1 and the intensity of noise added by the optical fiber 2 and the coherent optical reception front-end unit 10. The vertical axis indicates a Q value that is quality of a signal received in the coherent optical reception device 3. The Q value of the reception signal is plotted while varying the OSNR. The transmission signal is 16QAM. The Q value is derived by averaging Q values for all symbols of the reception signal and further averaging Q values with respect to four kinds of different polarized-wave states. Squares 70 shown in FIG. 12 indicate calculation results when the offset value adjustment unit 49 is not included in the DC offset compensation unit 40. Diamonds 71 shown in FIG. 12 indicate calculation results when the offset value adjustment unit 49 is included. From FIG. 12, it can be seen that the Q value is improved by about 0.4 to 0.5 dB by providing the offset value adjustment unit 49 in the DC offset compensation unit 40. FIG. 12 clearly shows that reception characteristics can be further improved by performing the DC offset compensation using the DC offset d by which an appropriate weighting coefficient according to a symbol of a reception signal is multiplied.

As described above, the offset value adjustment unit 49 that adjusts the DC offset d to be added to (subtracted from) the signal of the in-phase component of the X-polarized wave and/or the Y-polarized wave according to the amplitude of the corresponding quadrature component is included in the DC offset compensation unit 40 that performs DC offset compensation for the in-phase component of the X-polarized wave and/or the Y-polarized wave. Therefore, it is possible to further compensate for the distortion of the constellation, and to provide demodulation performance excellent to the same extent to any symbol of quadrature phase amplitude modulation such as 16QAM.

Figure 13:
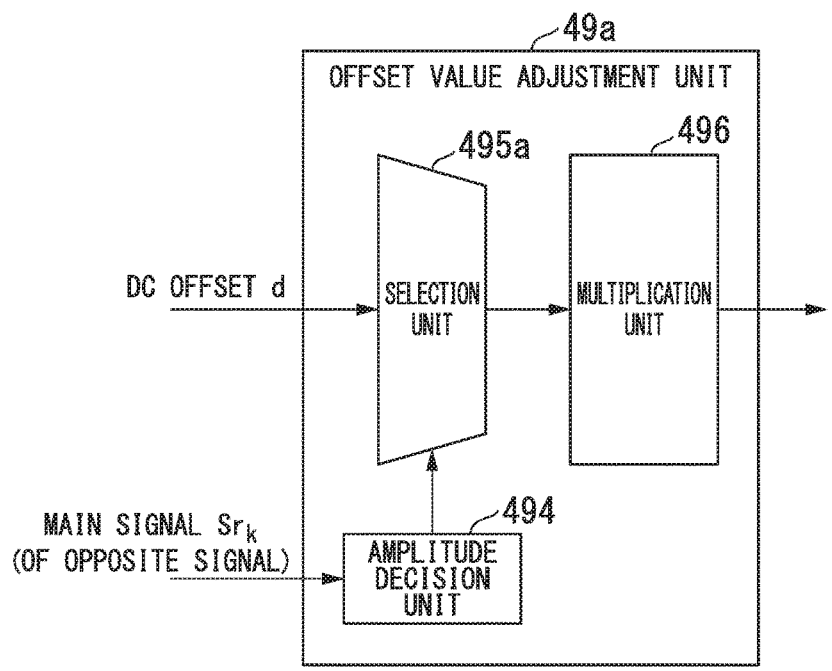
FIG. 13 is a block diagram showing another configuration example of the offset value adjustment unit.

In the example shown in FIG. 10, there is adapting the configuration in which the offset value adjustment unit 49 calculates the wl multiplication value and the ws multiplication value and outputs any one of the multiplication values according to the decision result. However, there may be adapting a configuration in which the offset value adjustment unit 49 calculates any one of the multiplication values according to the decision result and outputs the multiplication value. A configuration of the offset value adjustment unit 49 in such a configuration is shown in FIG. 13. FIG. 13 is a diagram showing another configuration example of the offset value adjustment unit 49. The offset value adjustment unit 49a shown in FIG. 13 includes the amplitude decision unit 494, the selection unit 495a, and the multiplication unit 496. The offset value adjustment unit 49a included in the DC offset compensation unit 40-1 will be described by way of example with reference to FIG. 13. The offset value adjustment unit 49a included in the DC offset compensation units 40-2, 40-3, and 40-4 performs the same process as the offset value adjustment unit 49a included in the DC offset compensation unit 40-1.

The selection unit 495a receives the signal output by the amplitude decision unit 494 and the DC offset d output by the filter circuit 47-1. Further, in the selection unit 495a, the weighting coefficients wl and ws are set in advance. The selection unit 495a outputs any of the weighting coefficients wl and ws and the DC offset d to the multiplication unit 496 on the basis of the signal input from the amplitude decision unit 494. Specifically, when the input signal indicates |E|<a predetermined threshold value Eth, the selection unit 495a outputs the weighting coefficient wl and the DC offset d to the multiplication unit 496. On the other hand, when the input signal indicates |E|>a predetermined threshold value Eth, the selection unit 495a outputs the weighting coefficient ws and the DC offset d to the multiplication unit 496.

The multiplication unit 496 receives the DC offset d and any one of the weighting coefficients wl and ws output from the selection unit 495a. The multiplication unit 496 multiplies the input DC offset d by the weighting coefficient to calculate a multiplication value. Specifically, when the weighting coefficient wl and the DC offset d are input, the multiplication unit 496 multiplies the input DC offset d by the weighting coefficient wl to calculate a wl multiplication value. Further, when the weighting coefficient ws and the DC offset d are input, the multiplication unit 496 multiplies the input DC offset d by the weighting coefficient ws to calculate a ws multiplication value. The multiplication unit 496 outputs the calculated multiplication value to the subtraction circuit 43-1.

With the configuration as described above, the offset value adjustment unit 49 need not necessarily calculate both of the wl multiplication value and the ws multiplication value. Therefore, it is possible to reduce a processing load.

In the above embodiment, the IQ crosstalk compensation unit 50 is included after the DC offset compensation unit 40, but the present invention is not limited to the embodiment. The IQ crosstalk compensation unit 50 may be connected to the compensation unit 20, and the DC offset compensation unit 40 may be connected subsequently. In this case, a sampling circuit is included in each of the four lanes between the IQ crosstalk compensation units 50X and 50Y and the carrier phase recovery unit 24 in place of the sampling circuit 41-1 included in the DC offset compensation unit 40. This sampling circuit is connected, for example, to a stage before the branch circuits 51X-1 and 51X-2 of the IQ crosstalk compensation unit 50X and a stage before the branch circuits of the IQ crosstalk compensation unit 50Y corresponding thereto.

Further, although the constellation distortion compensation unit 30 includes both of the DC offset compensation unit 40 and the IQ crosstalk compensation unit 50 in the above embodiment, the constellation distortion compensation unit 30 may include one thereof.

Further, although the local oscillation laser 11 operates independently of a transmission laser applied to the coherent optical transmission device 1 and is not frequency-synchronized with the transmission laser in the above embodiment, the configuration of the embodiment may be applied to a case in which the local oscillation laser 11 is frequency-synchronized with the transmission laser.

Further, in the above embodiment, the correlation coefficient calculation units 60X-1 and 60X-2 calculate the correlation coefficient on the basis of the in-phase modulation data component and the quadrature phase modulation data component on which the provisional decision is dynamically performed, but the configuration of the present invention is not limited to the embodiment. When a temporal change in the correlation coefficient is not great, the correlation coefficient calculation units 60X-1 and 60X-2 may calculate the correlation coefficient in advance and the coefficient multiplication circuits 54X-1 and 54X-2 may store the calculated correlation coefficient. In this case, the correlation coefficient calculation units 60X-1 and 60X-2 do not need to be necessarily included in the IQ crosstalk compensation unit 50X and an external calculation device may calculate the correlation coefficient.

The digital signal processing unit 13 in the above-described embodiment may be realized by a computer. In this case, the digital signal processing unit 13 may be realized by recording a program for realizing this function on a computer-readable recording medium, loading the program recorded on the recording medium into a computer system, and executing the program. Here, the "computer system" includes an OS or hardware such as a peripheral device. Further, the "computer-readable recording medium" refers to a portable medium such as a flexible disk, a magneto-optical disc, a ROM, or a CD-ROM, or a storage device such as a hard disk built into in the computer system. Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system including a server and a client in such a case. Further, the program may be a program for realizing some of the above-described functions or may be a program capable of realizing the above-described functions in a combination with a program previously stored in the computer system.

Further, the program may be realized using a programmable logic device such as a field programmable gate array (FPGA).

The embodiments of the present invention have been described above in detail with reference to the accompanying drawings, but specific configurations are not limited to the embodiments, and designs or the like without departing from the scope of the invention may be included.

INDUSTRIAL APPLICABILITY

The present invention can also be applied to applications in which it is necessary to compensate for the constellation distortion on the reception side.

REFERENCE SIGNS LIST

1 Coherent optical transmission device
2 Optical fiber
3 Coherent optical reception device
10 Coherent optical reception front-end unit
11 Local oscillation laser
12 Analog-to-digital converter
13 Digital signal processing unit
20 Compensation unit
21 Chromatic dispersion compensation unit
22 Polarization separation and polarization mode dispersion compensation unit
23 Frequency offset compensation unit
24 Carrier phase recovery unit
30 Constellation distortion compensation unit
40 (40-1 to 40-4) DC offset compensation unit
41-1 Sampling circuit
42-1 Branch circuit
43-1 Subtraction circuit
44-1 Modulation data component removal unit
45-1 Provisional decision circuit
46-1 Subtraction circuit
47-1 Filter circuit
48-1 Averaging unit
49, 49a Offset value adjustment unit
491 Branch unit
492 Weighting coefficient wl multiplication unit
493 Weighting coefficient ws multiplication unit
494 Amplitude decision unit
495, 495a Selection unit
496 Multiplication unit
50 IQ crosstalk compensation unit
50X IQ crosstalk compensation unit
50Y IQ crosstalk compensation unit
51X-1, 51X-2 Branch circuit
52X-1, 52X-2 Subtraction circuit
53X-1, 53X-2 Provisional decision circuit
54X-1, 54X-2 Coefficient multiplication circuit
60X-1, 60X-2 Correlation coefficient calculation unit
61X-1, 61X-2 Signal normalization circuit
63X-1, 63X-2 Inner product calculation circuit
64X-1, 64X-2 Averaging circuit
90 Error correction decoding unit
100 Coherent optical data transmission system

The invention claimed is:

1. A coherent optical reception device comprising:
a local oscillation laser that supplies laser light;
a coherent optical reception front-end unit that receives a multi-level modulated optical signal, demodulates the optical signal on the basis of the laser light, and converts a demodulated optical signal into an electrical analog signal;
an analog-to-digital converter that converts the analog signal into a digital signal;
a carrier phase compensation unit that compensates for an influence of dispersion due to a wavelength or a polarized wave of the optical signal and recovers a carrier phase of the digital signal;
a constellation distortion compensation unit that compensates for constellation distortion of the multi-level modulation included in the digital signal in which an influence of dispersion is compensated for by the carrier phase compensation unit; and
an error correction decoding unit that performs error correction of the digital signal in which the constellation distortion is compensated for,
wherein the constellation distortion compensation unit includes a DC offset compensation unit that compensates for a DC offset as the constellation distortion with respect to the digital signal, and
wherein the DC offset compensation unit includes
an averaging unit that reduces a modulation data component from the digital signal, removes random noise through averaging, and extracts the DC offset included in the digital signal; and
a first subtraction circuit that subtracts the DC offset extracted by the averaging unit from the digital signal.

2. The coherent optical reception device according to claim 1,
wherein the averaging unit includes
a provisional decision circuit that extracts the modulation data component from the digital signal;
a second subtraction circuit that subtracts the modulation data component extracted by the provisional decision circuit from the digital signal; and
a filter circuit that averages a subtraction result obtained by subtracting the modulation data component from the digital signal.

3. The coherent optical reception device according to claim 2,
wherein the DC offset compensation unit further includes an offset value adjustment unit that multiplies the DC offset extracted by the averaging unit by a weighting coefficient according to an amplitude of a signal of a quadrature phase component of the digital signal when the DC offset included in a signal of an in-phase component of the digital signal is compensated for, multiplies the DC offset extracted by the averaging unit by a weighting coefficient according to an amplitude of the signal of the in-phase component of the digital signal when the DC offset included in the signal of the quadrature phase component of the digital signal is compensated for, and outputs the DC offset multiplied by the weighting coefficient to the first subtraction circuit, and
wherein the first subtraction circuit subtracts the DC offset multiplied by the weighting coefficient output from the offset value adjustment unit, from the digital signal.

4. The coherent optical reception device according to claim 1,
wherein the DC offset compensation unit further includes an offset value adjustment unit that multiplies the DC offset extracted by the averaging unit by a weighting coefficient according to an amplitude of a signal of a quadrature phase component of the digital signal when the DC offset included in a signal of an in-phase component of the digital signal is compensated for, multiplies the DC offset extracted by the averaging unit by a weighting coefficient according to an amplitude of the signal of the in-phase component of the digital signal when the DC offset included in the signal of the quadrature phase component of the digital signal is compensated for, and outputs the DC offset multiplied by the weighting coefficient to the first subtraction circuit, and wherein the first subtraction circuit subtracts the DC offset multiplied by the weighting coefficient output from the offset value adjustment unit, from the digital signal.

5. The coherent optical reception device according to claim 4, wherein the offset value adjustment unit sets the weighting coefficient to a value greater than 1 when the amplitude of the signal of the quadrature phase component of the digital signal is smaller than a predetermined threshold value in a case in which the DC offset included in the signal of the in-phase component of the digital signal is compensated for or when the amplitude of the signal of the in-phase component of the digital signal is smaller than the predetermined threshold value in a case in which the DC offset included in the signal of the quadrature phase component of the digital signal is compensated for.

6. The coherent optical reception device according to claim 5, wherein the offset value adjustment unit sets the weighting coefficient to a value smaller than 1 when the amplitude of the signal of the quadrature phase component of the digital signal is equal to or greater than the predetermined threshold value in a case in which the DC offset included in the signal of the in-phase component of the digital signal is compensated for or when the amplitude of the signal of the in-phase component of the digital signal is equal to or greater than the predetermined threshold value in a case in which the DC offset included in the signal of the quadrature phase component of the digital signal is compensated for.

7. The coherent optical reception device according to claim 4, wherein the offset value adjustment unit sets the weighting coefficient to a value smaller than 1 when the amplitude of the signal of the quadrature phase component of the digital signal is equal to or greater than a predetermined threshold value in a case in which the DC offset included in the signal of the in-phase component of the digital signal is compensated for or when the amplitude of the signal of the in-phase component of the digital signal is equal to or greater than the predetermined threshold value in a case in which the DC offset included in the signal of the quadrature phase component of the digital signal is compensated for.

8. A coherent optical reception device comprising:
a local oscillation laser that supplies laser light;
a coherent optical reception front-end unit that receives a multi-level modulated optical signal, demodulates the optical signal on the basis of the laser light, and converts a demodulated optical signal into an electrical analog signal;
an analog-to-digital converter that converts the analog signal into a digital signal;
a carrier phase compensation unit that compensates for an influence of dispersion due to a wavelength or a polarized wave of the optical signal and recovers a carrier phase of the digital signal;
a constellation distortion compensation unit that compensates for constellation distortion of the multi-level modulation included in the digital signal in which an influence of dispersion is compensated for by the carrier phase compensation unit; and
an error correction decoding unit that performs error correction of the digital signal in which the constellation distortion is compensated for,
wherein the constellation distortion compensation unit includes an IQ crosstalk compensation unit that compensates for IQ crosstalk as the constellation distortion with respect to a signal of an in-phase component and a quadrature phase component of the digital signal, and
wherein the IQ crosstalk compensation unit includes:
a first provisional decision circuit that temporarily decides the signal of the in-phase component of the digital signal and extracts an in-phase modulation data component;
a first coefficient multiplication circuit that calculates the amount of leakage of the in-phase component to the signal of the quadrature phase component in the digital signal on the basis of the in-phase modulation data component;
a second provisional decision circuit that temporarily decides the signal of the quadrature phase component of the digital signal and extracts a quadrature phase modulation data component;
a second coefficient multiplication circuit that calculates the amount of leakage of the quadrature phase component to the signal of the in-phase component in the digital signal on the basis of the quadrature phase modulation data component;
a first subtraction circuit that subtracts an output value of the second coefficient multiplication circuit from the signal of the in-phase component signal of the digital signal; and
a second subtraction circuit that subtracts an output value of the first coefficient multiplication circuit from the signal of the quadrature phase component signal of the digital signal.

9. The coherent optical reception device according to claim 8,
wherein the IQ crosstalk compensation unit includes:
a first correlation coefficient calculation unit that calculates a first correlation coefficient indicating correlation between the in-phase component included in the signal of the quadrature phase component of the digital signal and the signal of the in-phase component; and
a second correlation coefficient calculation unit that calculates a second correlation coefficient indicating correlation between the quadrature phase component included in the signal of the in-phase component of the digital signal and the signal of the quadrature phase component,
wherein the first coefficient multiplication circuit multiplies the in-phase modulation data component by the first correlation coefficient and outputs a result of the multiplication, and
wherein the second coefficient multiplication circuit multiplies the quadrature phase modulation data component by the second correlation coefficient and outputs a result of the multiplication.

10. The coherent optical reception device according to claim 9,
wherein the first correlation coefficient calculation unit includes:
- a first signal normalization circuit that divides the quadrature phase modulation data component by a square of a norm of the quadrature phase modulation data component and outputs a result of the division;
- a first inner product calculation circuit that calculates an inner product of an output value of the first signal normalization circuit and the signal of the in-phase component; and
- a first averaging circuit that averages an inner product value calculated by the first inner product calculation circuit and outputs the first correlation coefficient, and wherein the second correlation coefficient calculation unit includes:
- a second signal normalization circuit that divides the quadrature phase modulation data component by a square of a norm of the quadrature phase modulation data component and outputs a result of the division;
- a second inner product calculation circuit that calculates an inner product of an output value of the second signal normalization circuit and the signal of the quadrature phase component; and
- a second averaging circuit that averages an inner product value calculated by the second inner product calculation circuit and outputs the second correlation coefficient.

11. A coherent optical reception device comprising:
a local oscillation laser that supplies laser light;
a coherent optical reception front-end unit that receives a multi-level modulated optical signal, demodulates the optical signal on the basis of the laser light, and converts a demodulated optical signal into an electrical analog signal;
an analog-to-digital converter that converts the analog signal into a digital signal;
a carrier phase compensation unit that compensates for an influence of dispersion due to a wavelength or a polarized wave of the optical signal and recovers a carrier phase of the digital signal;
a constellation distortion compensation unit that compensates for constellation distortion of the multi-level modulation included in the digital signal in which an influence of dispersion is compensated for by the carrier phase compensation unit; and
an error correction decoding unit that performs error correction of the digital signal in which the constellation distortion is compensated for,
wherein the constellation distortion compensation unit includes:
- a DC offset compensation unit that compensates for a DC offset as the constellation distortion with respect to the digital signal; and
- an IQ crosstalk compensation unit that compensates for IQ crosstalk as the constellation distortion with respect to a signal of an in-phase component and a quadrature phase component of the digital signal, and wherein the constellation distortion compensation unit includes the IQ crosstalk compensation unit in a stage subsequent to the carrier phase compensation unit and includes the DC offset compensation unit in a stage subsequent to the IQ crosstalk compensation unit.

* * * * *